US011877280B2

(12) United States Patent
Jiang

(10) Patent No.: US 11,877,280 B2
(45) Date of Patent: Jan. 16, 2024

(54) BUFFER STATUS REPORT TRANSMISSION AND DEVICE

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 323 days.

(21) Appl. No.: 17/333,455

(22) Filed: May 28, 2021

(65) Prior Publication Data

US 2021/0289526 A1 Sep. 16, 2021

Related U.S. Application Data

(63) Continuation of application No. 16/472,744, filed as application No. PCT/CN2018/073259 on Jan. 18, 2018, now Pat. No. 11,071,129.

(30) Foreign Application Priority Data

Dec. 8, 2017 (WO) ................ PCT/CN2017/115300

(51) Int. Cl.
*H04W 72/12* (2023.01)
*H04W 72/1268* (2023.01)
(Continued)

(52) U.S. Cl.
CPC ... *H04W 72/1268* (2013.01); *H04W 28/0278* (2013.01); *H04W 72/0446* (2013.01);
(Continued)

(58) Field of Classification Search
CPC ......... H04W 72/1268; H04W 28/0278; H04W 72/0446; H04W 80/02
See application file for complete search history.

(56) References Cited

U.S. PATENT DOCUMENTS 9,357,562 B2 5/2016 Quan et al.
2011/0255492 A1* 10/2011 Dai ...................... H04W 72/21
370/329
(Continued)

FOREIGN PATENT DOCUMENTS

CN 101771521 A 7/2010
CN 101778418 A 7/2010
(Continued)

OTHER PUBLICATIONS

Combined Chinese Office Action and Search Report dated Apr. 26, 2021 in corresponding Chinese Patent Application No. 201780002117.5 (with English Translation and English Translation of Category of Cited Documents), 34 pages.
(Continued)

*Primary Examiner* — Brenda H Pham
(74) *Attorney, Agent, or Firm* — Oblon, McClelland, Maier & Neustadt, L.L.P.

(57) ABSTRACT

The disclosure relates to a buffer status report transmitting method, including: receiving a configuration message sent by a base station; determining uplink resource allocation indication information sent by the base station and an uplink transmission time interval corresponding to the information based on the configuration message; determining an estimated duration based on the time interval; determining whether there is an uplink shared channel resource available in an uplink transmission opportunity within the estimated duration from the buffer status report trigger time or the time of the physical downlink control channel; sending a buffer status report to the base station if there is an uplink shared channel resource available in the uplink transmission opportunity. According to an example of the present disclosure, it may be avoided that the user device cannot transmit the
(Continued)

buffer status report to the base station because the available uplink shared channel resources cannot be determined.

9 Claims, 16 Drawing Sheets

(51) Int. Cl.
| | | |
|---|---|---|
| *H04W 28/02* | (2009.01) | |
| *H04W 72/0446* | (2023.01) | |
| *H04W 80/02* | (2009.01) | |
| *H04W 72/21* | (2023.01) | |
| *H04W 72/50* | (2023.01) | |

(52) U.S. Cl.
CPC ......... *H04W 72/21* (2023.01); *H04W 72/535* (2023.01); *H04W 80/02* (2013.01)

(56) References Cited

U.S. PATENT DOCUMENTS

| | | | |
|---|---|---|---|
| 2012/0099452 A1 | 4/2012 | Dai et al. | |
| 2012/0263095 A1 | 10/2012 | Quan et al. | |
| 2016/0100397 A1 | 4/2016 | Wen et al. | |
| 2016/0135171 A1 | 5/2016 | Korhonen et al. | |
| 2016/0366682 A1 | 12/2016 | Tseng et al. | |
| 2017/0127433 A1 | 5/2017 | Lin | |
| 2017/0311317 A1* | 10/2017 | Dinan | H04W 72/52 |
| 2019/0150176 A1 | 5/2019 | Pelletier et al. | |

FOREIGN PATENT DOCUMENTS

| | | | |
|---|---|---|---|
| CN | 101932019 A | 12/2010 | |
| CN | 102118189 A | 7/2011 | |
| CN | 102202343 A | 9/2011 | |
| CN | 102333341 A | 1/2012 | |
| CN | 102907161 A | 1/2013 | |
| CN | 104040930 A | 9/2014 | |
| CN | 104661311 A | 5/2015 | |
| CN | 104780608 A | 7/2015 | |
| CN | 105050189 A | 11/2015 | |
| CN | 106105305 A | 11/2016 | |
| CN | 106255210 A | 12/2016 | |
| CN | 106658743 A | 5/2017 | |
| CN | 106714213 A | 5/2017 | |
| CN | 107046727 A | 8/2017 | |
| CN | 107113200 A | 8/2017 | |
| CN | 107277856 A | 10/2017 | |
| CN | 107347215 A | 11/2017 | |
| CN | 107370575 A | 11/2017 | |
| CN | 107409370 A | 11/2017 | |
| CN | 108401517 A | 8/2018 | |
| CN | 108476432 A | 8/2018 | |
| EP | 2 816 844 A1 | 12/2014 | |
| EP | 3 226 639 A1 | 10/2017 | |
| WO | WO 2012/146210 A1 | 11/2012 | |
| WO | WO 2015/045268 A1 | 4/2015 | |
| WO | WO 2017/098384 A2 | 6/2017 | |
| WO | WO 2017/172452 A1 | 10/2017 | |
| WO | WO 2017/197264 A1 | 11/2017 | |

OTHER PUBLICATIONS

Office Action dated Aug. 17, 2021 in corresponding Chinese Patent Application No. 201880000034.7 (with English Translation, 8 pages.
"Logical Channel Prioritization with short TTI" Tdoc R2-1701609 3GPP TSG-RAN WG2 #97 Athens, Greece, Feb. 13-13, 2017, Source: Ericsson.
International Search Report dated Aug. 28, 2018 in PCT/CN2018/073259 filed Jan. 18, 2018.
International Search Report dated Jun. 27, 2018 in PCT/CN2017/115300 filed Dec. 8, 2017 (with English translation of Categories of Cited Documents), 5 Pages.
International Search Report dated Jul. 26, 2018 in PCT/CN2018/071406 filed Jan. 4, 2018 (with English translation of Categories of Cited Documents), 5 Pages.
Institute for Information Industry (III), "Scheduling request based on prescheduling transmission," 3GPP TSG-RAN WG2 Meeting #92, R2-156244, Nov. 2015, 4 Pages.
Combined Chinese Office Action and Search Report dated Jun. 12, 2020, in Patent Application No. 201880000034.7 (with English translation), 20 pages.
International Preliminary Report on Patentability and Written Opinion of the International Searching Authority dated Jun. 27, 2018 in PCT/CN2017/115300 (with English translation), 7 pages.
International Preliminary Report on Patentability and Written Opinion of the International Searching Authority dated Jul. 26, 2018 in PCT/CN2018/071406 (with English translation), 8 pages.
International Preliminary Report on Patentability and Written Opinion of the International Searching Authority dated Aug. 28, 2018 in PCT/CN2018/073259 (with English translation), 8 pages.
Combined Chinese Office Action and Search Report dated Nov. 3, 2020 in Chinese Patent Application No. 201780002117.5 (with English translation), 28 pages.
Extended European Search Report dated Sep. 24, 2020 in European Patent Application No. 18886442.5, 10 pages.
Ericsson, "Logical Channel Prioritization with short TTI", 3GPP TSG-RAN WG2#97bis, Tdoc R2-1703210, 3$^{rd}$ Generation Partnership Project (3GPP), XP051254002, Apr. 3-7, 2017, 3 pages.
Qualcomm Incorporated, "SR and BSR for short TTI", 3GPP TSG-RAN2 Meeting #98 , R2-1705749, 3$^{rd}$ Generation Partnership Project (3GPP), XP051265151, May 15-19, 2017, 2 pages.
Office Action dated Jan. 21, 2021 issued in corresponding Chinese patent application No. 201880000012.0 (with English translation).
Office Action dated Mar. 3, 2021 issued in corresponding Chinese patent application No. 201880000034.7 (with English translation).

\* cited by examiner

Determine a maximum time interval in the correlation table of the shared channel transmission durations and the time intervals in the LCP restricted parameter of the logical channel in the configuration message as the estimated duration ~ S304

FIG. 6

Obtain a correlation table of shared channel transmission durations and time intervals from the configuration message ~ S305

Determine a minimum time interval in the correlation table as the estimated duration ~ S306

FIG. 7

Obtain a correlation table of shared channel transmission durations and time intervals from the configuration message ~ S307

Perform calculation for each time interval in the correlation table according to a preset algorithm, and use the calculation result as the estimated duration ~ S308

FIG. 8

BUFFER STATUS REPORT TRANSMISSION AND DEVICE

This application is a continuation of U.S. application Ser. No. 16/472,744, filed on Jun. 21, 2019, which is a U.S. National Stage application of PCT International Application No. PCT/CN2018/073259 filed on Jan. 18, 2018, which is based on and claims priority to PCT International Application No. PCT/CN2017/115300 filed on Dec. 8, 2017, the entire contents of which are incorporated herein by reference.

TECHNICAL FIELD

The present application relates to the field of communications technologies, and in particular, to a buffer status report transmission method, a buffer status report transmission device, an electronic device, and a computer-readable storage medium.

BACKGROUND

A user device may trigger a buffer status report (BSR) after receiving uplink resource allocation indication information (i.e., UR grant) sent by a base station regardless of whether it is operating in an LTE (Long Term Evolution) network or an NR (New Radio) network, and determines whether the BSR can be sent to the base station.

Generally, the BSR may be carried in the Uplink Shared Channel (ULSCH) resource. If no uplink shared channel resource is available, it may be necessary to send a Scheduling Request (SR) to the base station to request for the uplink shared channel resource.

In the related art, several methods may be provided for determining whether there are available uplink shared channel resources.

One method in the related art is to determine whether there is an immediately-available uplink shared channel resource. For this, the user device may have different criterions of the "immediately," so that it is impossible to accurately determine a time period in which the uplink shared channel resource could be counted as available uplink shared channel resource since the BSR trigger time.

Another method in the related art is to determine whether there is available uplink shared channel resource in a next Transmission Time Interval (TTI). In this way, since the TTI is not a constant, but being, for example, one, two, four or eight symbols, the user device cannot determine the number of symbols to which one TTI corresponds.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method of transmitting a buffer status report, the method being applicable to a user device. The method includes receiving a configuration message sent by a base station; determining uplink resource allocation indication information sent by the base station and an uplink transmission time interval corresponding to the uplink resource allocation indication information based on the configuration message; determining an estimated duration based on the time interval; determining a buffer status report trigger time, and a time of a physical downlink control channel that precedes the buffer status report trigger time; determining whether there is an uplink shared channel resource available in an uplink transmission opportunity, the uplink transmission opportunity being within a time range of the estimated duration from the buffer status report trigger time or from the time of the physical downlink control channel; and sending a buffer status report to the base station when there is an uplink shared channel resource available in the uplink transmission opportunity.

According to an aspect, the method further includes determining a maximum transmission duration of an uplink shared channel based on the configuration message, wherein determining the estimated duration based on the time interval includes obtaining a correlation table between shared channel transmission durations and the time intervals from the configuration message; determining a maximum time interval in the time intervals corresponding to the shared channel transmission durations which are less than the maximum transmission duration of the uplink shared channel in the correlation table, as the estimated duration; or determining the time interval corresponding to the maximum transmission duration of the uplink shared channel in the correlation table as the estimated duration.

In an example, when determining the maximum transmission duration of the uplink shared channel based on the configuration message, the method further includes determining whether the buffer status report is triggered periodically, or whether the buffer status report is triggered by a buffer status report retransmission timer timeout; determining a logical channel with the highest priority from logical channels where data to be transmitted exists, when the buffer status report is triggered periodically or triggered by the buffer status report retransmission timer timeout; and determining the maximum transmission duration of the uplink shared channel based on a logical channel prioritization LCP restricted parameter of the logical channel with the highest priority in the configuration message.

In another example, when determining the maximum transmission duration of the uplink shared channel based on the configuration message, the method further includes determining the maximum transmission duration of the uplink shared channel based on the LCP parameter of the logical channel that triggers the buffer status report in the configuration message when the buffer status report is not triggered periodically or triggered by the buffer status report retransmission timer timeout; and obtaining a maximum shared channel transmission duration from the correlation table as the maximum transmission duration of the uplink shared channel, when the maximum transmission duration of the uplink shared channel does not exist in the LCP restricted parameter of the logical channel that triggers the buffer status report, or when the logical channel that triggers the buffer status report is not determined.

In yet another example, when determining the logical channel with the highest priority from the logical channels where data to be transmitted exists, the method further includes determining the logical channel with the highest priority from the logical channels where data to be transmitted exists and that are configured with the restricted parameter of the shared channel transmission duration.

In yet another example, when determining the estimated duration based on the time interval, the method further includes determining a maximum time interval in the correlation table between the shared channel transmission durations and the time intervals in a logical channel prioritization LCP restricted parameter of the logical channel in the configuration message as the estimated duration.

In yet another example, when determining the estimated duration based on the time interval, the method further includes obtaining a correlation table between shared channel transmission durations and the time intervals from the configuration message; and determining a minimum time interval in the correlation table as the estimated duration.

In yet another example, when determining the estimated duration based on the time interval, the method further includes obtaining a correlation table between shared channel transmission durations and the time intervals from the configuration message; and performing calculation for each time interval in the correlation table based on a preset algorithm, and using the calculation result as the estimated duration.

According to another aspect, the method further includes, before determining the estimated duration based on the time interval, when the configuration information includes a configured duration corresponding to a logical channel required for sending the buffer status report, wherein the configured duration is equal to a specified time interval in the correlation table between the shared channel transmission durations and the time intervals; and using the configured duration as the estimated duration.

According to yet another aspect, the method further includes, before determining whether there is an uplink shared channel resource available in the uplink transmission opportunity: determining a preset interval corresponding to a carrier transmitting the buffer status report, wherein the preset interval is processing time required by the user device, from an end time of the physical downlink control channel through which the user device receives the uplink resource allocation indication information, until a start time of latest possible physical downlink shared channel transmission; and determining whether there is an uplink shared channel resource available in an uplink transmission opportunity, the uplink transmission opportunity being within a time range of the estimated duration from the buffer status report trigger time or from the time of the physical downlink control channel, wherein determining whether there is the uplink shared channel resource available in the uplink transmission opportunity further includes: determining whether a time duration from the available uplink shared channel resource to the buffer status report trigger time is greater than the preset interval, and determining that there is an uplink shared channel resource available in the uplink transmission opportunity when the time duration is greater than the preset interval.

In an example, when there is an uplink shared channel resource available in the uplink transmission opportunity, and when sending the buffer status report to the base station by using the available uplink shared channel resource, the method further includes, when there is an uplink shared channel resource available in the uplink transmission opportunity: determining whether the available uplink shared channel resource is capable of carrying a buffer status report; and sending the buffer status report to the base station by the available uplink shared channel resource when the available uplink shared channel resource is capable of carrying the buffer status report.

According to another aspect, the method further includes, when there is no uplink shared channel resource available in the uplink transmission opportunity, or when there is an uplink shared channel resource available in the uplink transmission opportunity and the available uplink shared channel resource is not applicable to transmitting data of the logical channel that triggers the buffer status report: determining to trigger a scheduling request, and determining whether to send the scheduling request, wherein, a time of determining to trigger the scheduling request is a scheduling request trigger time; when the scheduling request is sent: requesting for the uplink shared channel resource by the scheduling request being sent; and sending the buffer status report to the base station by the requested uplink shared channel resource; when the scheduling request is not sent: requesting for the uplink shared channel resource by a random access request to the base station; and sending the buffer status report to the base station by the requested uplink shared channel resource.

In an example, when determining whether to send the scheduling request, the method further includes determining whether there is an uplink shared channel resource available in an uplink transmission opportunity within a time range of the estimated duration from the trigger time of the scheduling request and from the time of each physical downlink control channel after the trigger time of the scheduling request; for an uplink transmission opportunity that does not have an available uplink shared channel resource, determining whether a medium access control entity is configured with an available physical uplink control channel resource within an estimated duration corresponding to the uplink transmission opportunity; and when the medium access control entity is configured with the available physical uplink control channel resource within the estimated duration corresponding to the uplink transmission opportunity, determining to send a scheduling request, otherwise, determining not to send the scheduling request.

In another example, when determining whether to send the scheduling request, the method further includes determining whether there is an uplink shared channel resource available in the uplink transmission opportunity within a time range of the estimated duration from the time of the latest physical downlink control channel before the trigger time of the scheduling request, and from the time of each physical downlink control channel after the trigger time of the scheduling request; for an uplink transmission opportunity that does not have an available uplink shared channel resource: determining whether a medium access control entity is configured with an available physical uplink control channel resource within an estimated duration corresponding to the uplink transmission opportunity; and when the medium access control entity is configured with the available physical uplink control channel resource within the estimated duration corresponding to the uplink transmission opportunity, determining to send a scheduling request, otherwise, determining not to send the scheduling request.

Aspects of the disclosure also provide an electronic device including a processor and a memory for storing instructions executable by the processor. The processor is configured to receive a configuration message sent by a base station; determine uplink resource allocation indication information sent by the base station and an uplink transmission time interval corresponding to the uplink resource allocation indication information based on the configuration message; determine an estimated duration based on the time interval; determine a buffer status report trigger time, and a time of a physical downlink control channel that precedes the buffer status report trigger time; determine whether there is an uplink shared channel resource available in an uplink transmission opportunity, the uplink transmission opportunity being within a time range of the estimated duration from the buffer status report trigger time or from the time of the physical downlink control channel; and when there is an uplink shared channel resource available in the uplink transmission opportunity, send a buffer status report to the base station by the available uplink shared channel resource.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

FIG. 6 is a schematic flow chart showing how to determine an estimated duration based on the time interval according to an exemplary aspect of the present disclosure.

FIG. 7 is another schematic flow chart showing how to determine an estimated duration based on the time interval according to an exemplary aspect of the present disclosure.

FIG. 8 is still another schematic flow chart showing how to determine an estimated duration based on the time interval according to an exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1:
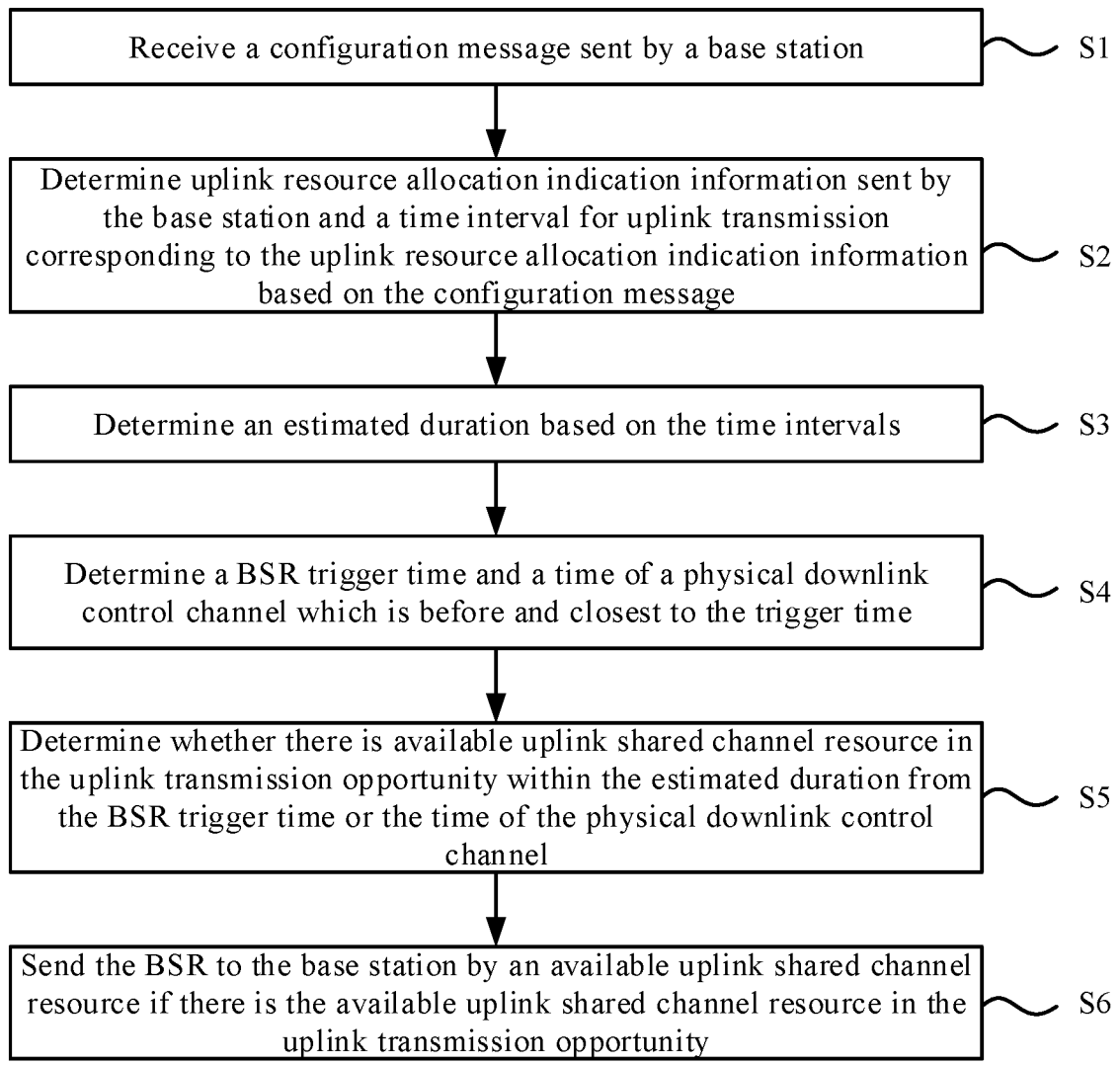
FIG. 1 is a schematic flow chart of a method of sending a buffer status report according to an exemplary aspect of the present disclosure.

FIG. 1 is a schematic flow chart of a method of sending a buffer status report (BSR) according to an example of the present disclosure. The method of sending the BSR shown in this example may be applicable to a user device, which may be an electronic device such as a mobile phone, a tablet computer and a wearable device.

As shown in FIG. 1, the method of sending the BSR may include the following blocks.

In block S1, a configuration message sent by a base station is received.

In an example, the configuration message may be a Radio Resource Control (RRC) message or other types of messages.

In block S2, uplink resource allocation indication information sent by the base station and a time interval for uplink transmission (that is, the uplink transmission opportunity for transmitting uplink data by the user device) corresponding to the uplink resource allocation indication information are determined based on the configuration message.

In an example, the configuration message may include a correlation table of shared channel transmission durations and the time intervals. The correlation table includes, in addition to the shared channel transmission durations and the time intervals, a start symbol (for example, Orthogonal Frequency Division Multiplexing (OFDM) symbol) position of the uplink transmission opportunity corresponding to each of the shared channel transmission durations and the like. The correlation table may also include a Logical Channel Prioritization (LCP) restricted parameter of each logical channel, information relating a cell allocated for the user device, information relating a subcarrier space allocated for the user device, and the type of the uplink resource allocation indication information.

From the above, the configuration message may include various contents in which at least the time interval is included, and may be set as required.

For example, the configuration message includes the correlation table between the shared channel transmission durations and the time intervals. After receiving the configuration message, the user device may send the correlation table to a medium access control layer via a radio resource control layer or a physical layer. The user device may send only the time intervals in the correlation table to the medium access control layer. And on this basis, the shared channel transmission durations and/or start symbols in the correlation table may also be sent to the medium access control layer.

In block S3, an estimated duration is determined based on the time intervals.

In block S4, a BSR trigger time and a time of a physical downlink control channel which is before and closest to the trigger time are determined.

In an example, the time of the physical downlink channel may be a start time or an end time of the physical downlink channel, and no matter it is the start time or the end time, both of them are before the BSR trigger time. The end time of the physical downlink channel can be preferably employed.

In block S5, it is determined whether there is available uplink shared channel resource in the uplink transmission opportunity within the estimated duration from the BSR trigger time or the time of the physical downlink control channel.

In block S6, if there is available uplink shared channel resource in the uplink transmission opportunity, the BSR is sent to the base station by the available uplink shared channel resource.

In an example, by determining the estimated duration, being a relatively fixed duration, the user device can determine a time period in which the uplink transmission opportunity could be regarded as having available uplink shared channel resources since the BSR trigger time or the time of the physical downlink control channel. Then, the BSR may be sent to the base station through the available uplink shared channel resources, thereby preventing the user device from being unable to send a BSR to the base station due to being unable to determine available uplink shared channel resources.

In an example, if there is no uplink shared channel resource available in the uplink transmission opportunity, the SR may be triggered, and it may be further determined whether to send the SR, which will be shown in the following examples.

Figure 2:
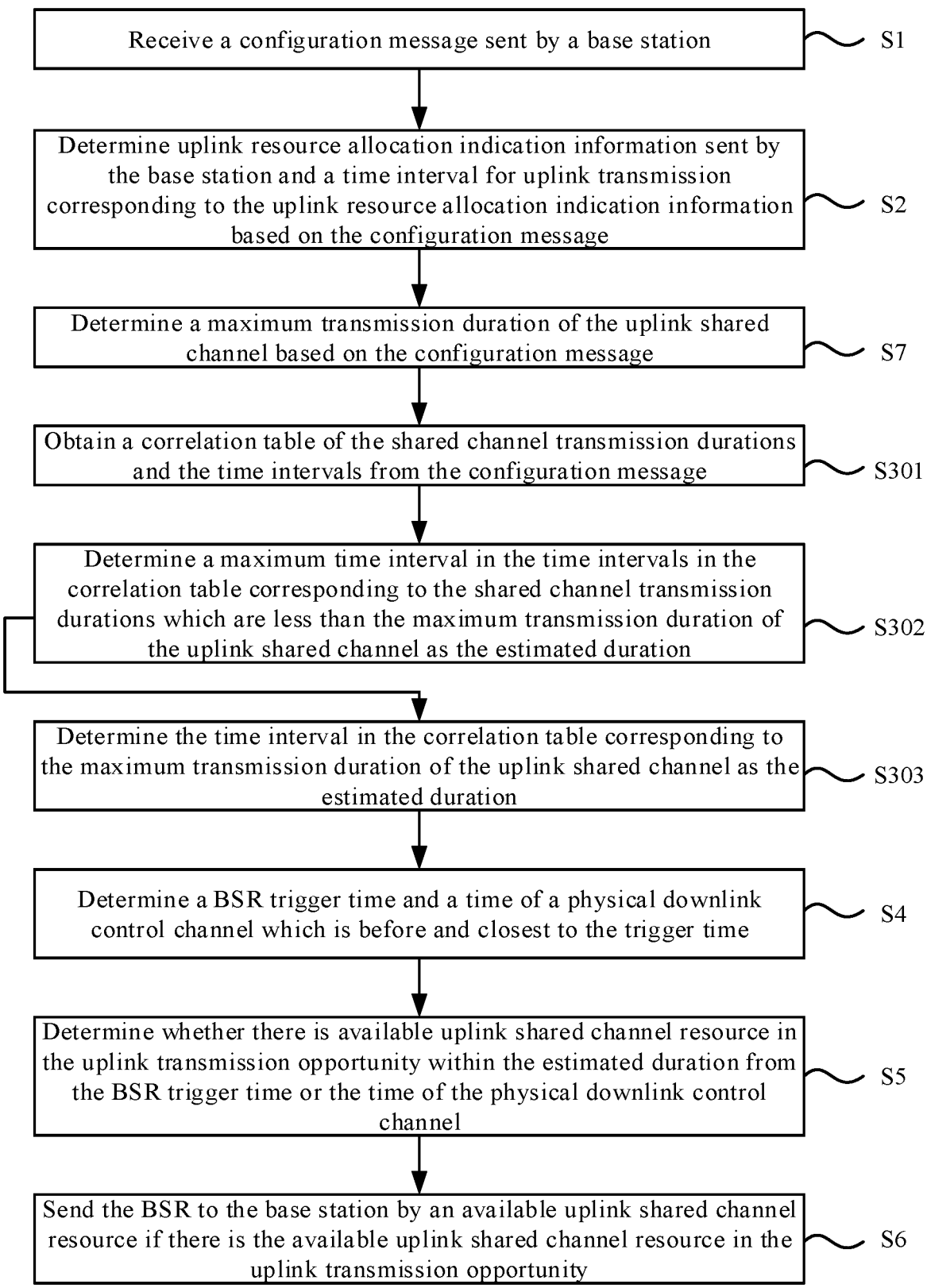
FIG. 2 is a schematic flow chart of another method of sending a buffer status report according to an exemplary aspect of the present disclosure.

FIG. 2 is a schematic flow chart showing another method of sending a BSR according to an example of the present disclosure. As shown in FIG. 2, based on the example shown in FIG. 1, the method further includes the following blocks.

In block S7, a maximum transmission duration of the uplink shared channel may be determined based on the configuration message.

The determining the estimated duration based on the time intervals includes the following blocks S301-S303.

In block S301, a correlation table of the shared channel transmission durations and the time intervals is obtained from the configuration message.

In block S302, a maximum time interval in the time intervals in the correlation table corresponding to the shared channel transmission durations which are less than the maximum transmission duration of the uplink shared channel is determined as the estimated duration.

In block S303, the time interval in the correlation table corresponding to the maximum transmission duration of the uplink shared channel is determined as the estimated duration.

In an example, whether to determine the estimated duration by block S302 or block S303 may be selected as needed. For example, take that the estimated duration is determined by block S302 as an example, that is, the maximum time interval in the time intervals corresponding to the shared channel transmission durations in the correlation table which are less than the maximum transmission duration of the uplink shared channel may be determined as the estimated duration.

In an example, the time interval may be determined only based on time intervals corresponding to the shared channel transmission durations in the correlation table. And if the configuration message includes the time intervals, and the start symbol position of the uplink transmission opportunity corresponding to each shared channel transmission duration, and the time intervals are in unit of slot, then the start symbol positions may be further determined when determining the slots corresponding to the time intervals, and the time from the start symbol position to receiving the uplink resource allocation indication information is used as the time interval. Based on this, the accuracy of determining the time interval can be improved.

Optionally, the determining a maximum transmission duration of the uplink shared channel based on the configuration message includes:
determining whether the BSR is triggered periodically, or whether the BSR is triggered by a BSR retransmission timer timeout;
determining a logical channel with the highest priority from the logical channels in which the data to be transmitted is buffered if the BSR is triggered periodically or triggered by the BSR retransmission timer timeout;
determining a maximum transmission duration of an uplink shared channel based on a LCP restricted parameter of the logical channel with the highest priority in the configuration message.

In an example, if the BSR is not triggered periodically or by the BSR retransmission timer timeout, that is, the BSR is not triggered by a logical channel, none logical channel triggering the BSR can be detected. In this case, a logical channel with the highest priority may be determined from the logical channels in which data to be transmitted (data to be transmitted can be stored in the buffer of the logical channel) is buffered, and the maximum transmission duration of the uplink shared channel can be determined based on the LCP restricted parameter of the logical channel with the highest priority in the configuration message. In this way, it can be avoided that the maximum transmission duration of the uplink shared channel cannot be determined due to the inability to determine a logical channel.

Optionally, the determining the logical channel with the highest priority from the logical channels in which data to be transmitted is buffered, includes:

determining the logical channel with the highest priority from the logical channels in which data to be transmitted is buffered and which are configured with the shared channel transmission duration restricted parameters.

In an example, on the basis of determining there exist logical channels in which data to be transmitted is buffered, logical channels configured with the shared channel transmission duration restricted parameters may be determined from the existing logical channels, and a logical channel with the highest priority may be further determined from the determined logical channels, and then the maximum transmission duration of the uplink shared channel may be determined based on the LCP restricted parameter of the logical channel with the highest priority.

Figure 3:
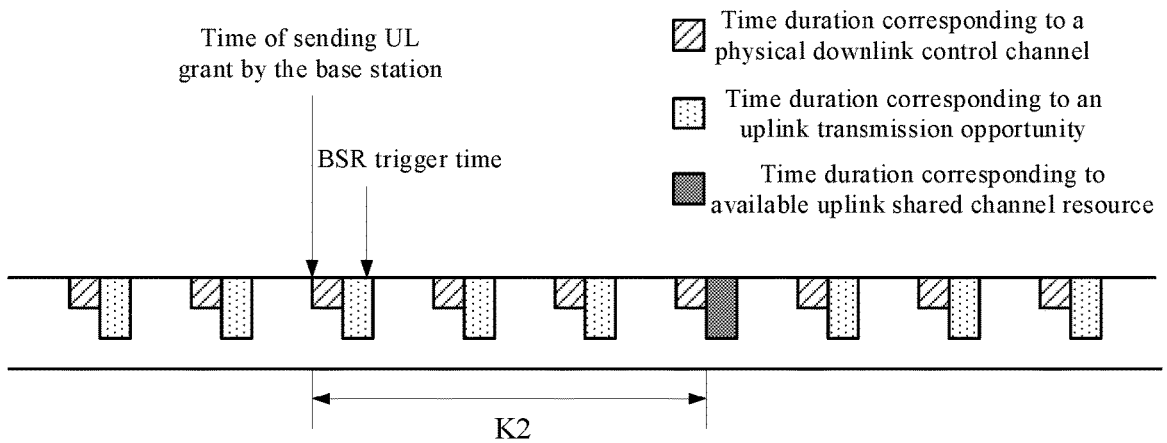
FIG. 3 is a schematic diagram showing a time interval K2 according to an exemplary aspect of the present disclosure.

FIG. 3 is a schematic diagram showing a time interval K2 in accordance with an example of the present disclosure.

In an example, as shown in FIG. 3, the time interval between the uplink resource allocation indication information (UL grant) sent by the base station and the uplink transmission corresponding to the uplink resource allocation indication information is K2. The UL grant may be a UL grant before the BSR trigger time, or may be a UL grant after the BSR trigger time. In this example, it may be mainly described by taking the UL grant before the BSR trigger time as an example. From the time when the base station sends the UL grant, there is an available uplink shared channel resource, used for the user device to transmit the uplink data, in the uplink transmission opportunity corresponding to the K2 duration.

In the related art, the user device cannot accurately determine a time period in which the uplink transmission opportunity has available uplink shared channel resource since the BSR trigger time. This will lead to that the user device determines that there is no available uplink shared channel resource in the uplink transmission opportunity within the first time period after the BSR trigger time, thereby determining that the UL grant does not configure the available uplink shared channel resource for sending the BSR. Further, a scheduling request (SR) is sent to the base station. In fact, the most recent UL grant before the BSR trigger time is configured to allocate the available uplink shared channel resources for sending the BSR, but the length of the uplink transmission opportunity of the allocated available uplink shared channel resource to the BSR trigger time is greater than the first duration. In this case, the user device will generate an erroneous determination result, thereby falsely triggering the SR.

Figure 4:
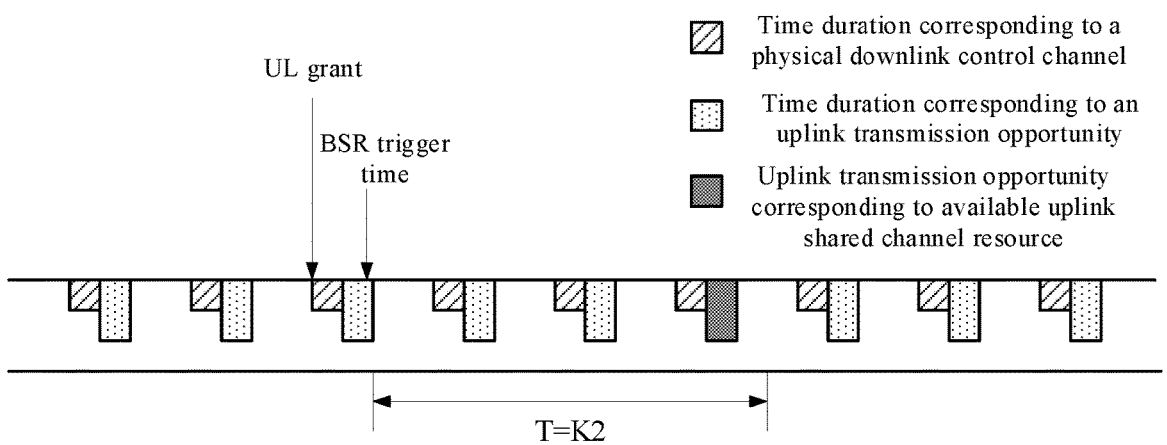
FIG. 4 is a schematic diagram showing an estimated duration T according to an exemplary aspect of the present disclosure.

FIG. 4 is a schematic diagram of an estimated duration T, shown in accordance with an example of the present disclosure.

In an example, as shown in FIG. 4, since the estimated duration T is the maximum time interval K2 in the time intervals corresponding to the shared channel transmission durations less than the maximum transmission duration of the uplink shared channel in the correlation table, the uplink transmission opportunities in the time range of the estimation time length T since the BSR trigger time necessarily include the uplink transmission opportunities corresponding to the available or unavailable uplink shared channel resources configured by the UR grant.

On the basis of this, it is determined whether there is an uplink shared channel resource available in the uplink transmission opportunity, thereby ensuring that the uplink transmission opportunities corresponding to the available or unavailable uplink shared channel resources configured by the UR grant can be included. Thus, when an available uplink shared channel resource is included in the uplink transmission opportunity, it may be determined that the BSR is sent through the uplink shared channel resource, thereby avoiding false triggering of the SR.

Figure 5:
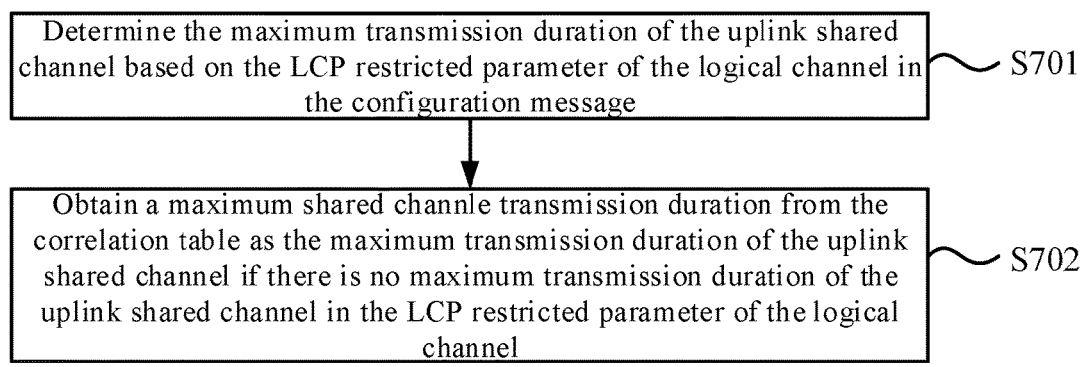
FIG. 5 is a schematic flow chart of determining a maximum transmission duration of an uplink shared channel according to an exemplary aspect of the present disclosure.

FIG. 5 is a schematic flowchart of determining a maximum transmission duration of an uplink shared channel according to an example of the present disclosure. As shown in FIG. 5, on the basis of the example shown in FIG. 2, determining a maximum transmission duration of an uplink shared channel based on the configuration message, may include the following blocks.

In block S701, if the BSR is not triggered periodically or triggered by a BSR retransmission timer timeout, the maximum transmission duration of the uplink shared channel is determined based on the LCP restricted parameter of the logical channel that triggers the BSR in the configuration message.

In block S702, if there is no maximum transmission duration of the uplink shared channel in the LCP restricted parameter of the logical channel triggering the BSR, or the logical channel triggering the BSR is not determined, the maximum shared channel transmission duration is obtained from the correlation table as the maximum transmission duration of the uplink shared channel.

In an example, the maximum transmission duration of the uplink shared channel may be configured in the LCP restricted parameter of the logical channel, and after the configuration message is received, the maximum transmission duration of the uplink shared channel is preferably determined from the LCP restricted parameter of the logical channel in the configuration message. When the maximum transmission duration of the uplink shared channel does not exist in the LCP restricted parameter of the logical channel, or the logical channel triggering the BSR is not determined (for example, the BSR is triggered periodically or by a BSR retransmission timer timeout), then the maximum shared channel transmission duration may be obtained from the correlation table as the maximum transmission duration of the uplink shared channel.

FIG. 6 is a schematic flow chart showing determination of an estimated duration based on the time intervals, according to an example of the present disclosure. As shown in FIG. 6, on the basis of the example shown in FIG. 1, the determining the estimated duration based on the time intervals includes the following blocks.

In block S304, a maximum time interval in the correlation table of the shared channel transmission durations and the time intervals, is determined in the LCP restricted parameter of the logical channel in the configuration message as the estimated duration.

In an example, the time interval may be configured in a LCP restricted parameter of the logical channel, by referring to the time intervals in the correlation table of the shared channel transmission durations and the time intervals. For example, the maximum time interval in the correlation table may be configured in the LCP restricted parameter of the logical channel. Furthermore, after the configuration message is received, the time interval in the LCP restricted parameter of the logical channel in the configuration message may be determined as the estimated duration.

FIG. 7 is a schematic flow chart showing another determination of an estimated duration based on the time intervals, according to an example of the present disclosure. As shown in FIG. 7, on the basis of the example shown in FIG. 1, the determining the estimated duration based on the time intervals includes the following blocks.

In block S305, a correlation table of shared channel transmission durations and time intervals is obtained from the configuration message;

In block S306, a minimum time interval in the correlation table is determined as the estimated duration.

In an example, in addition to determining the estimated duration according to the example shown in FIG. 2, the minimum time interval in the correlation table of shared channel transmission durations and time intervals may be determined as the estimated duration.

FIG. 8 is a schematic flow chart showing still determining an estimated duration based on the time intervals according to an example of the present disclosure. As shown in FIG. 8, on the basis of the example shown in FIG. 1, the determining the estimated duration based on the time intervals includes the following blocks.

In block S307, a correlation table of shared channel transmission durations and time intervals is obtained from the configuration message;

In block S308, calculation is performed for each time interval in the correlation table according to a preset algorithm, and the calculation result is used as the estimated duration.

In an example, calculation may also be performed for each time interval in the correlation table according to a preset algorithm as needed, for example, an average value of each time interval may be calculated as an estimated duration, or a mean square root of each time interval may be calculated as the estimated duration.

Figure 9:
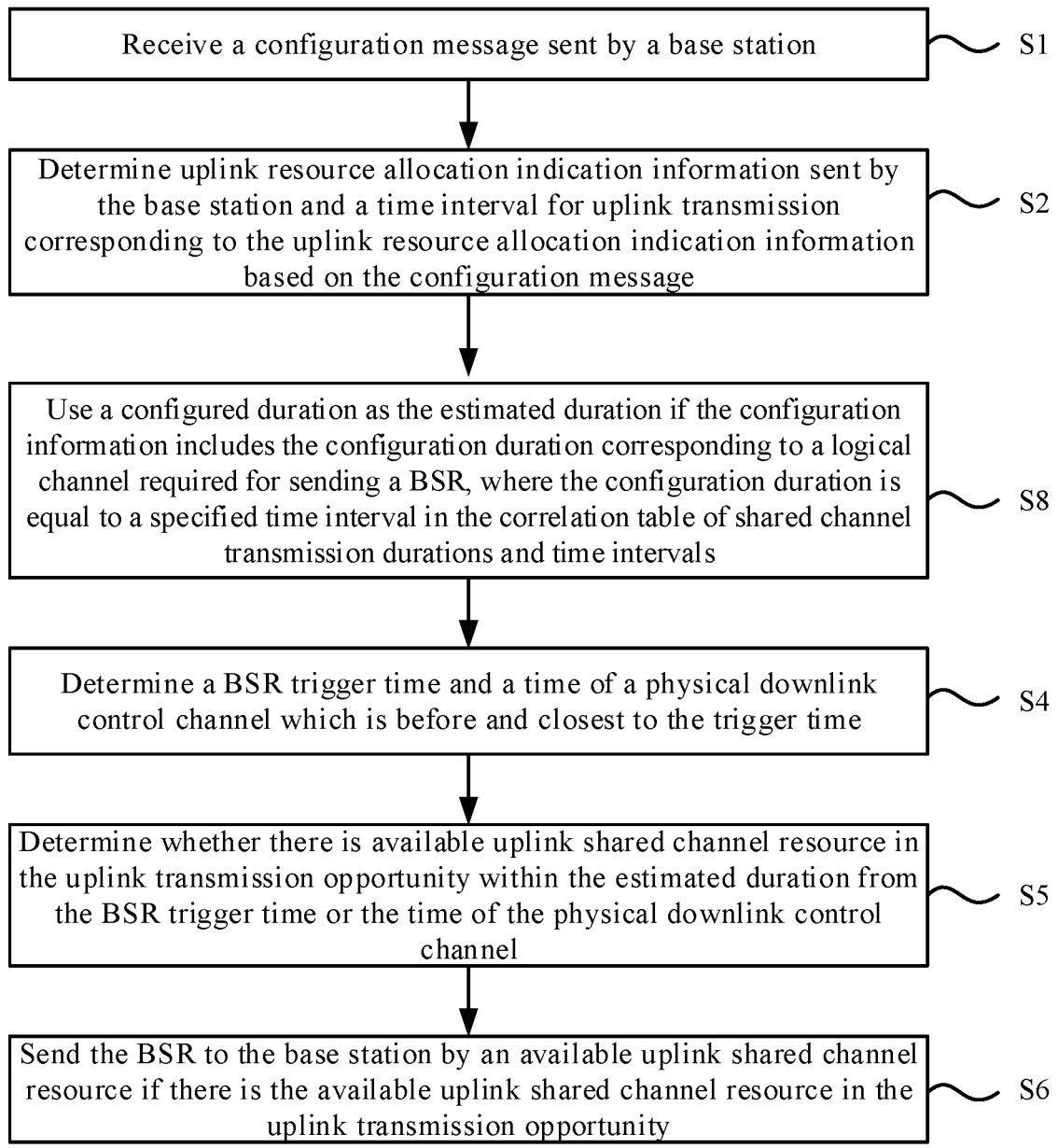
FIG. 9 is a schematic flow chart showing still another method of sending a buffer status report according to an exemplary aspect of the present disclosure.

FIG. 9 is a schematic flow chart of still another method for sending a BSR according to an example of the present disclosure. As shown in FIG. 9, the method further includes the following blocks.

In block S8, before determining the estimated duration according to the time intervals, if the configuration information includes a configuration duration corresponding to a logical channel required for sending a BSR, where the configuration duration is equal to a specified time interval in the correlation table of shared channel transmission durations and time intervals, the configured duration is used as the estimated duration.

In an example, the configuration information sent by the base station to the user device may include the configuration duration. When the user device determines that the configuration duration exists in the configuration information, the configuration duration may be used as the estimated duration, without determining the estimated duration based on the time intervals. It should be noted that the configuration duration in the configuration information may be set as needed. For example, a certain time interval in the correlation table of shared channel transmission durations and time intervals may be selected as the configuration duration, where the certain time interval is designated on the base station side.

Figure 10:
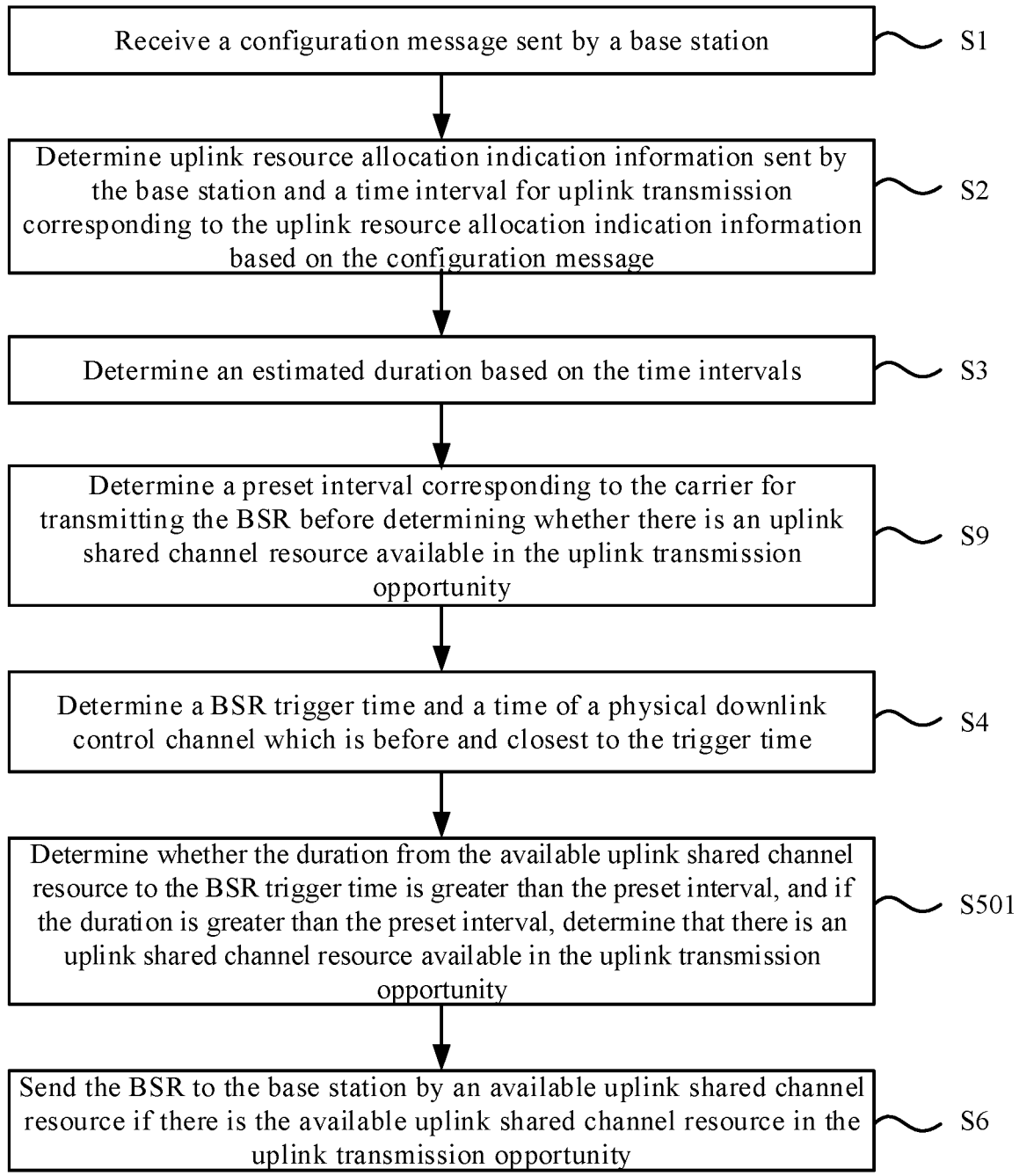
FIG. 10 is a schematic flow chart showing still another method of sending a buffer status report according to an exemplary aspect of the present disclosure.

FIG. 10 is a schematic flow chart of still another method for sending a BSR according to an example of the present disclosure. As shown in FIG. 10, the method further includes the following blocks.

In block S9, before determining whether there is an uplink shared channel resource available in the uplink transmission opportunity, a preset interval corresponding to the carrier for transmitting the BSR may be determined. The preset interval is a processing time required by the user device from the end time of the physical downlink control channel through which the user device receives the uplink resource allocation indication information, to the start time of the latest possible physical downlink shared channel transmission.

Determining whether there is available uplink shared channel resource in the uplink transmission opportunity within the estimated duration from the BSR trigger time or the time of the physical downlink control channel, includes the following blocks.

In block S501, it is determined whether the duration from the available uplink shared channel resource to the BSR trigger time is greater than the preset interval. If the duration is greater than the preset interval, it is determined that there is an uplink shared channel resource available in the uplink transmission opportunity.

In an example, different carriers may correspond to different preset intervals. For the carrier transmitting the BSR, a preset interval N2 corresponding to the carrier may be determined. The preset interval N2 is a processing time from the time (which may be the start time or the end time of the physical downlink control channel) of the physical downlink control channel through which the uplink resource allocation indication information is received, till the time of the latest available uplink channel resource from the BSR trigger time. Commonly, there is data to be transmitted already configured in the uplink transmission opportunity within the preset interval N2.

Therefore, when the available uplink shared channel resources are determined, it may be further determined whether the time interval from the available uplink shared channel resource to the BSR trigger time is greater than the preset interval. If not, the available uplink shared channel resource cannot be used for sending the BSR. And then, it may be determined that there is no uplink shared channel resource available in the uplink transmission opportunity. If Yes, the available uplink shared channel resource can be used for sending the BSR. And then, it may be determined that there is an uplink shared channel resource available in the uplink transmission opportunity.

Figure 11:
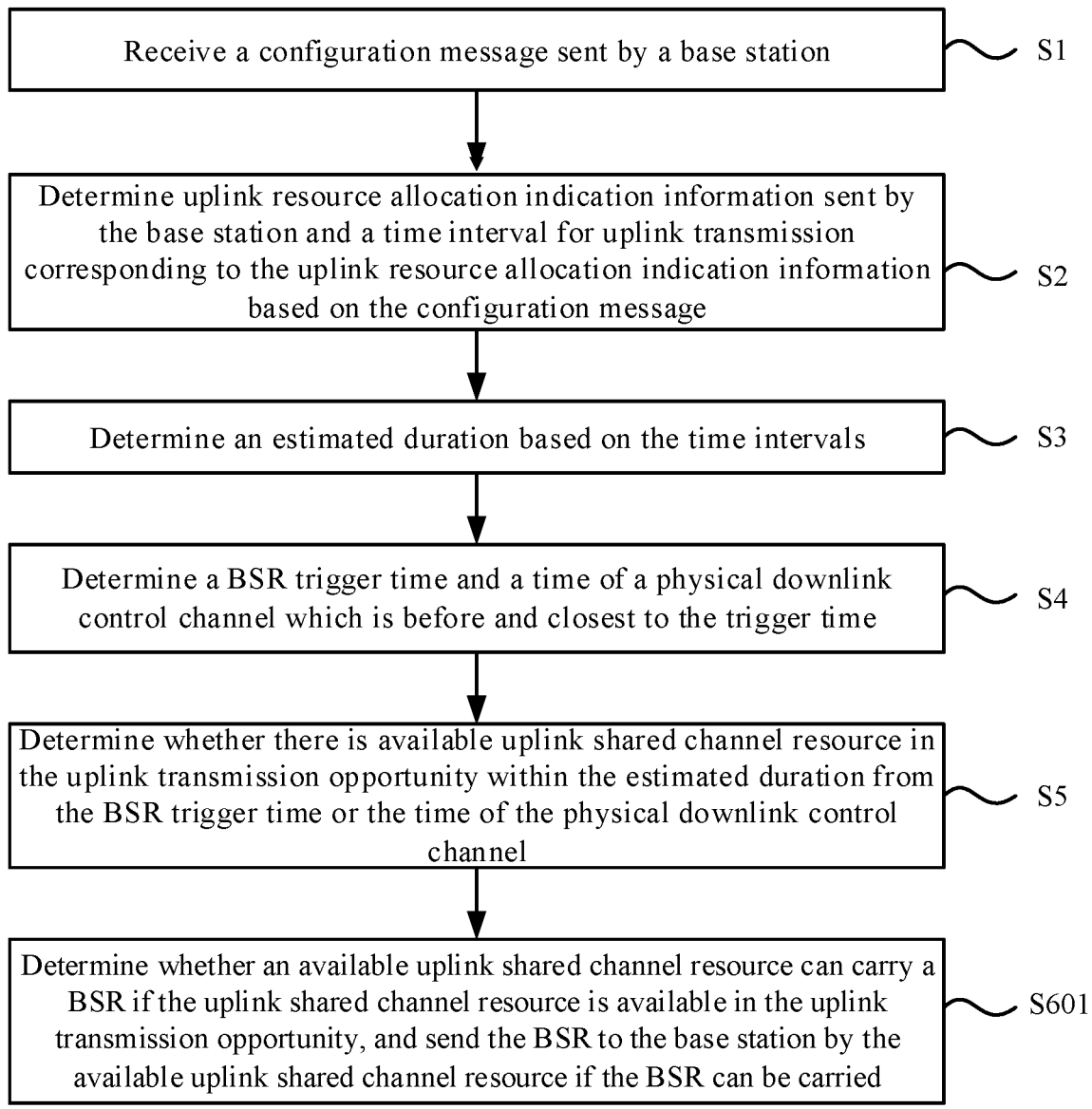
FIG. 11 is a schematic flow chart showing still another method of sending a buffer status report according to an exemplary aspect of the present disclosure.

FIG. 11 is a schematic flow chart of still another method for sending a BSR according to an example of the present disclosure. As shown in FIG. 11, on the basis of the example shown in FIG. 1, if there is an uplink shared channel resource available in the uplink transmission opportunity, transmitting the BSR to the base station by the available uplink shared channel resource includes the following blocks.

In block S601, if there is an uplink shared channel resource available in the uplink transmission opportunity, it is determined whether the available uplink shared channel resource can carry a BSR, and if the BSR can be carried, the BSR can be sent to the base station by using the uplink shared channel resource.

In an example, when it is determined that there is an uplink shared channel resource available in the uplink transmission opportunity, the available uplink shared channel resource may not be used to carry the BSR due to configuration problems although it may be used for transmitting the uplink data. Therefore, it may be further determined whether the available uplink shared channel resource can carry the BSR. If the BSR can be carried, the BSR is sent to the base station through the uplink shared channel resource.

Figure 12:
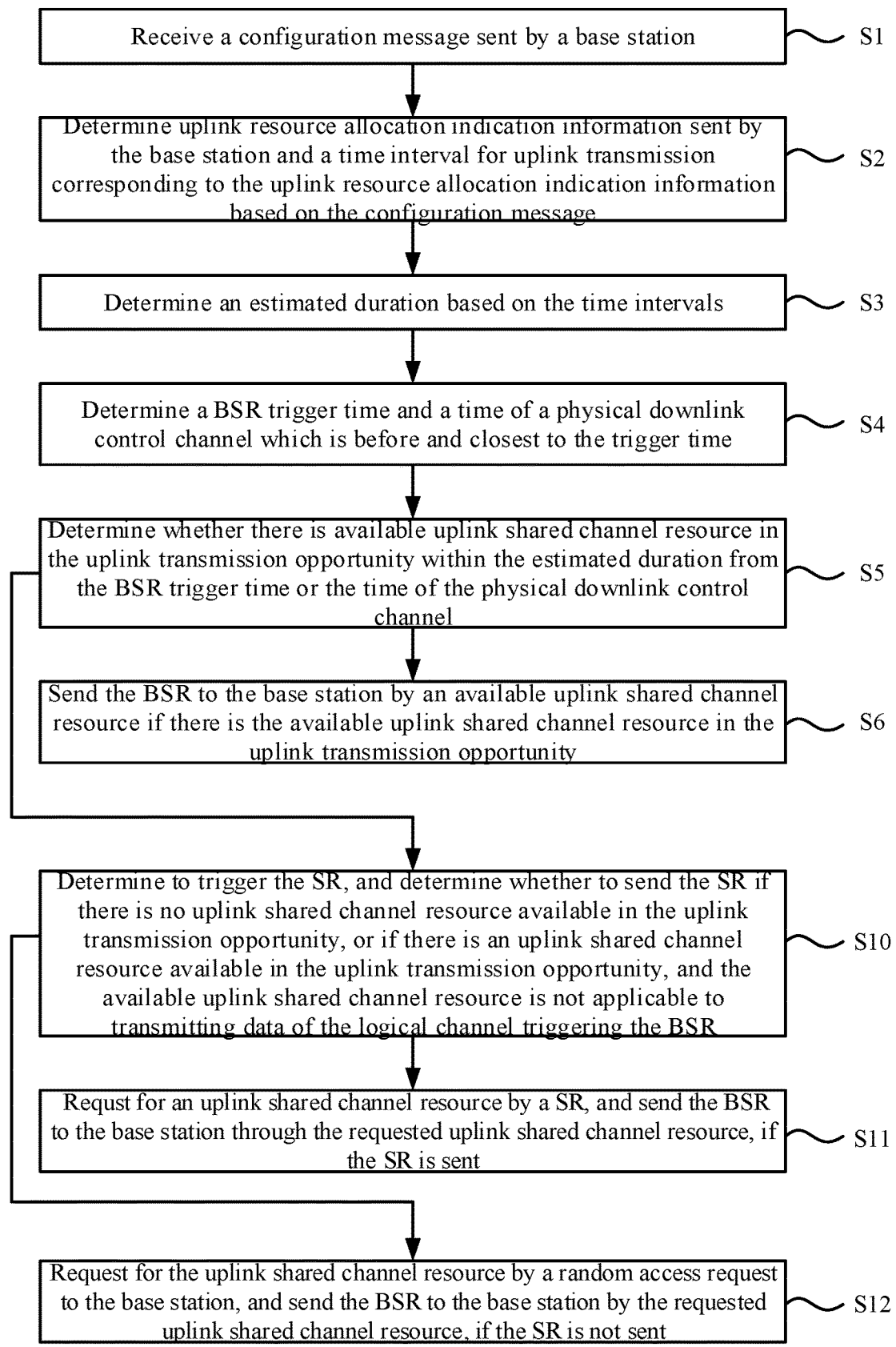
FIG. 12 is a schematic flow chart showing still another method of sending a buffer status report according to an exemplary aspect of the present disclosure.

FIG. 12 is a schematic flow chart of still another method for sending a BSR according to an example of the present disclosure. As shown in FIG. 12, based on any of the examples shown in FIG. 1 to FIG. 11, the method further includes the following blocks.

In block S10, if there is no uplink shared channel resource available in the uplink transmission opportunity, or if there is an uplink shared channel resource available in the uplink transmission opportunity, and the available uplink shared channel resource is not applicable to transmitting data of the logical channel triggering the BSR, then it can be determined to trigger the SR, and determined whether to send the SR. Herein, the time of determining to trigger the SR is referred to as SR trigger time.

In block S11, if a SR is sent, an uplink shared channel resource is requested by the SR being sent, and the BSR is sent to the base station through the requested uplink shared channel resource.

In block S12, if the SR is not sent, the uplink shared channel resource is requested by a random access request to the base station, and the BSR is sent to the base station by using the requested uplink shared channel resource.

In an example, if there is no uplink shared channel resource available in the uplink transmission opportunity, it may be determined to trigger the SR. If there is an uplink shared channel resource available in the uplink transmission opportunity, but the available uplink shared channel resource is not applicable to transmitting data of the logical channel triggering the BSR, for example, the parameters configured for the available uplink shared channel resource do not satisfy the LCP restriction of the logical channel that triggers the BSR (for example, the shared channel transmission duration restriction, the cell restriction, and the subcarrier space restriction), then it may also be determined to trigger the SR.

Furthermore, it may be determined whether to send the SR, and in the case of determining to send the SR, the uplink shared channel resource may be requested by means of the SR, so that the BSR may be sent to the base station by using the requested uplink shared channel resource. If the SR is determined not to be sent, the uplink shared channel resource may be requested by a random access request to the base station, and the BSR is sent to the base station by using the requested uplink shared channel resource. Thereby it can be ensured that the user device sends the BSR to the base station smoothly.

It should be noted that, in the example shown in FIG. 12, the condition that "if there is no uplink shared channel resource available in the uplink transmission opportunity" means not satisfying the condition A: "there is uplink shared channel resource available in the uplink transmission opportunity within the estimated duration from the BSR trigger time or the time of the physical downlink control channel".

It may also mean not satisfying the condition B: "whether the time duration from the uplink shared channel resource to the BSR trigger time is greater than the preset interval", or the condition C: "if there is uplink shared channel resource available in an uplink transmission opportunity, the available uplink shared channel resource may carry the BSR", or both the conditions B and C.

In an example, a random access request may be initiated in the primary cell or the primary/secondary cell.

Figure 13:
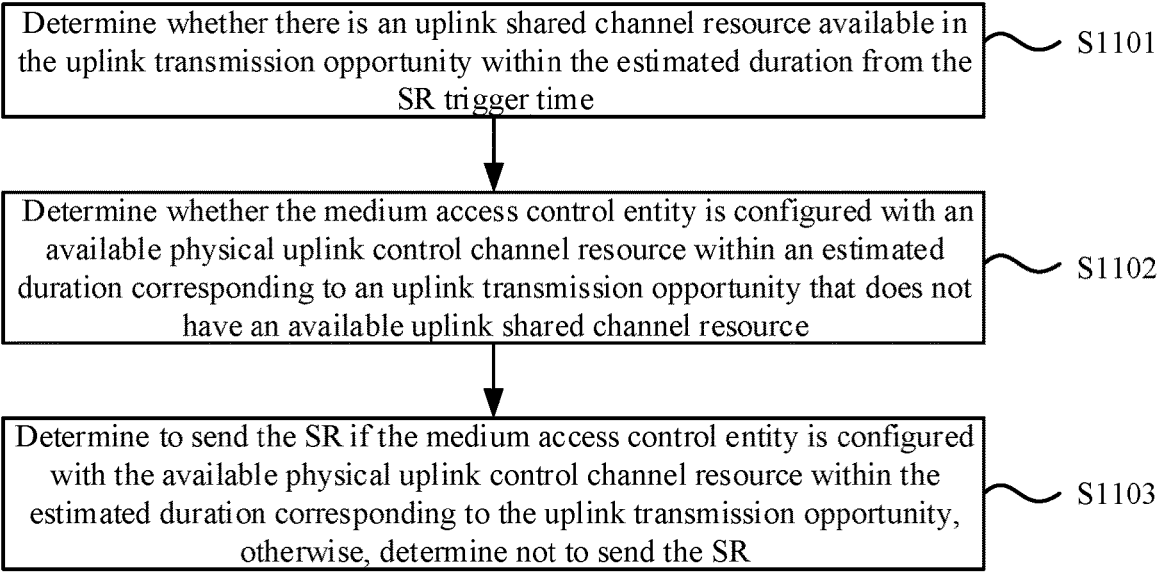
FIG. 13 is a schematic flow chart showing a method of determining whether to send a scheduling request according to an exemplary aspect of the present disclosure.

FIG. 13 is a schematic flow chart of determining whether to send a SR according to an example of the present disclosure. As shown in FIG. 13, on the basis of the example shown in FIG. 12, the determining whether to send a SR includes the following blocks.

In block 1101, it is determined whether there is an uplink shared channel resource available in the uplink transmission opportunity within the estimated duration from the SR trigger time and from the time of each physical downlink control channel after the SR trigger time;

In block 1102, for an uplink transmission opportunity that does not have an available uplink shared channel resource, it may be determined whether the medium access control entity is configured with an available uplink control channel resource within an estimated duration corresponding to the uplink transmission opportunity;

In block 1103, if the medium access control entity is configured with the available uplink control channel resource within the estimated duration corresponding to the uplink transmission opportunity, it may be determined to send the SR, otherwise, it may be determined not to send the SR.

In an example, it may be determined first whether there is an uplink shared channel resource available in the uplink transmission opportunity within the estimated duration from the SR trigger time and from the time of each physical downlink control channel after the SR trigger time. If there is an uplink shared channel resource available in the uplink transmission opportunity, the BSR may be sent through the available uplink shared channel resource without sending a SR.

When there is no uplink shared channel resource available in the uplink transmission opportunity, it may be further determined whether the medium access control entity is configured with available physical uplink control channel resource within the estimated duration corresponding to the uplink transmission opportunity. If the medium access control entity is configured with available physical uplink control channel resource, it may be possible to send scheduling information through the physical uplink control channel resource, and therefore, the scheduling information may be determined to be sent. If the medium access control entity is not configured with available physical uplink control channel resource, it may be not possible to send the scheduling information, and therefore, the scheduling information may be determined not to be sent.

Figure 14:
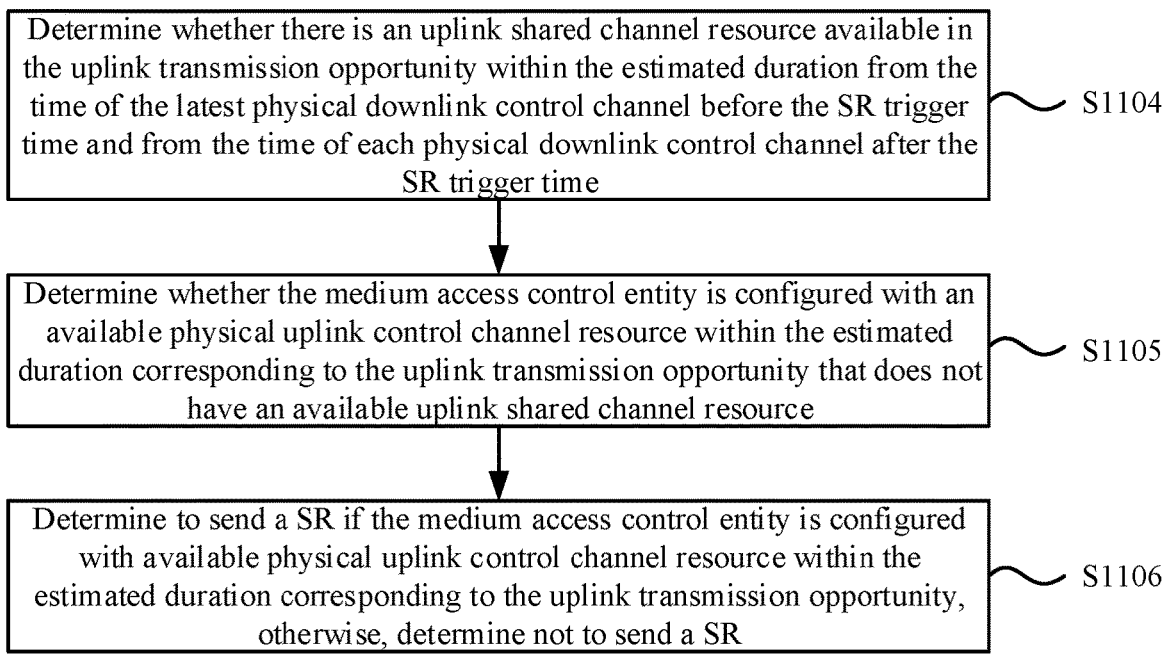
FIG. 14 is a schematic flow chart showing another method of determining whether to send a scheduling request according to an exemplary aspect of the present disclosure.

FIG. 14 is a schematic flow chart showing another method of determining whether to send a SR according to an example of the present disclosure. As shown in FIG. 14, on the basis of the example shown in FIG. 12, the determining whether to send a SR includes the following blocks.

In block 1104, it may be determined whether there is an uplink shared channel resource available in the uplink transmission opportunity within the estimated duration from the time of the latest physical downlink control channel before the SR trigger time and from the time of each physical downlink control channel after the SR trigger time;

In block 1105, for an uplink transmission opportunity that does not have an available uplink shared channel resource, it may be determined whether the medium access control entity is configured with an available physical uplink control channel resource within the estimated duration corresponding to the uplink transmission opportunity;

In block 1106, if the medium access control entity is configured with available physical uplink control channel resource within the estimated duration corresponding to the uplink transmission opportunity, it may be determined to send a SR, otherwise, it may be determined not to send a SR.

In an example, it may be first determined whether there is available uplink shared channel resource in the uplink transmission opportunity within the time period of estimated duration from the time of the latest physical downlink control channel before the SR trigger time and from the time of each physical downlink control channel after the SR trigger time. If there is an uplink shared channel resource available in the uplink transmission opportunity, the BSR may be sent through the available uplink shared channel resource without sending a SR.

When there is no uplink shared channel resource available in the uplink transmission opportunity, it may be further determined whether the medium access control entity is configured with the available physical uplink control channel resource within the estimated duration corresponding to the uplink transmission opportunity. If the medium access control entity is configured with the available physical uplink control channel resource, it may be possible to send the scheduling information through the physical uplink control channel resource, and therefore, the scheduling information can be determined to be sent. If the medium access control entity is not configured with the available physical uplink control channel resource, it may be not possible to send the scheduling information, and therefore, the scheduling information may be determined not to be sent.

Figure 15:
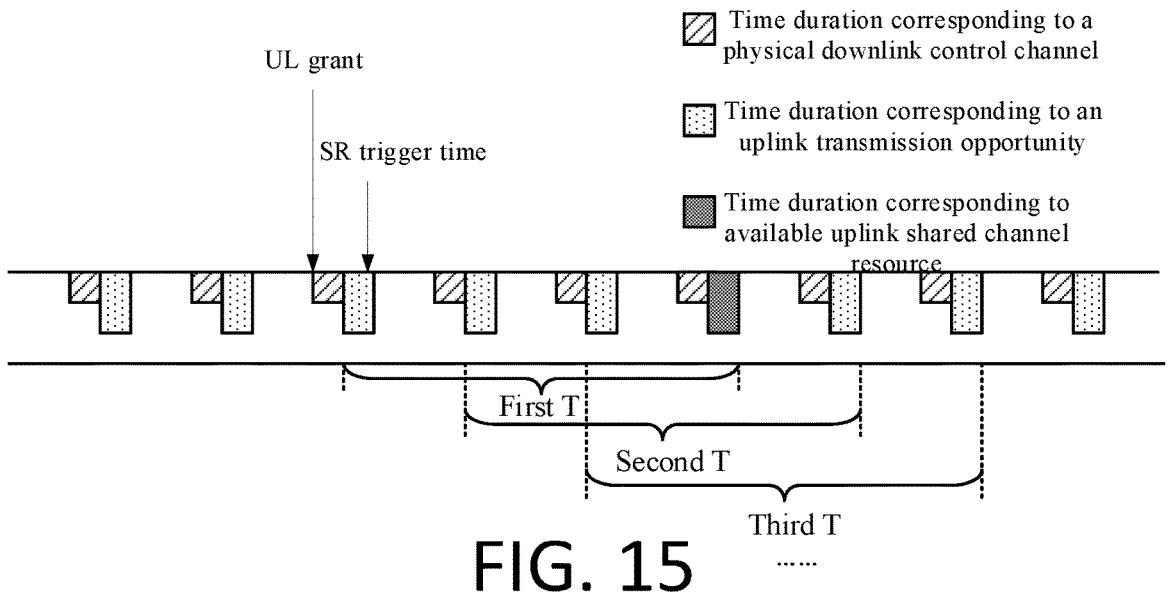
FIG. 15 is a schematic diagram showing still another method of determining whether to send a scheduling request according to an exemplary aspect of the present disclosure.

FIG. 15 is a schematic diagram of determining whether to send a SR according to an example of the present disclosure.

In an example, it may be determined, for each physical downlink control channel after the SR trigger time, whether there is an uplink shared channel resource available in the uplink transmission opportunity within the estimated duration from the time of the physical downlink control channel (for example, the starting time or the end time of the physical downlink control channel).

As shown in FIG. 15, the first T is a time range of the estimated duration from the time of the latest physical downlink control channel before the SR trigger time; the second T is a time range of the estimated duration from the time of the first physical downlink control channel after the SR trigger time; the third T is a time range of the estimated duration from the time of the second physical downlink control channel, and so on; for each time range of the estimated duration, if it is determined to send scheduling information, the scheduling information may be separately sent.

Figure 16:
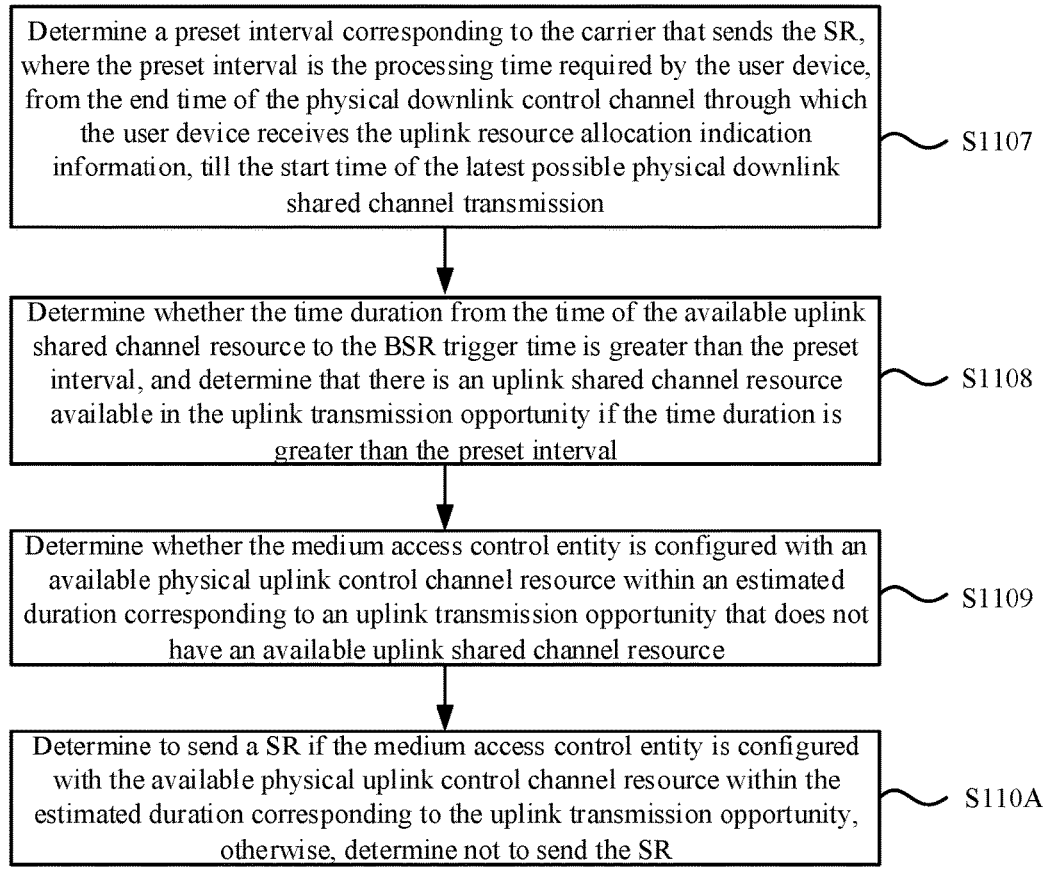
FIG. 16 is a schematic flow chart showing still another method of determining whether to send a scheduling request according to an exemplary aspect of the present disclosure.

FIG. 16 is a schematic flow chart showing still determining whether to send a SR according to an example of the present disclosure. As shown in FIG. 16, on the basis of the example shown in FIG. 12, the determining whether to send a SR includes the following blocks.

In block 1107, a preset interval corresponding to the carrier that sends the SR is determined, where the preset interval is the processing time required by the user device, from the end time of the physical downlink control channel through which the user device receives the uplink resource allocation indication information, till the start time of the latest possible physical downlink shared channel transmission;

In block 1108, it is determined whether the time duration from the time of the available uplink shared channel resource to the BSR trigger time is greater than the preset interval. If the time duration is greater than the preset interval, it may be determined that there is an uplink shared channel resource available in the uplink transmission opportunity;

In block 1109, for an uplink transmission opportunity that does not have an available uplink shared channel resource, it may be determined whether the medium access control entity is configured with an available physical uplink control channel resource within an estimated duration corresponding to the uplink transmission opportunity;

In block 110A, if the medium access control entity is configured with the available physical uplink control channel resource within the estimated duration corresponding to the uplink transmission opportunity, it may be determined to send a SR, otherwise, it may be determined not to send the SR.

In an example, it may be first determined whether there is an uplink shared channel resource available in the uplink transmission opportunity within the estimated duration from the time which adds the time of the latest physical downlink control channel before the SR trigger time with the preset interval, and from the time which adds the time of each physical downlink control channel after the SR trigger time with the preset interval. If there is available uplink shared channel resource, the BSR may be sent through the available uplink shared channel resource without sending the SR request.

When there is no uplink shared channel resource available in the uplink transmission opportunity, it may be further determined whether the medium access control entity is configured with the available physical uplink control channel resource within the estimated duration corresponding to the uplink transmission opportunity. If the medium access control entity is configured with the available physical uplink control channel resource, it may be possible to send the SR through the physical uplink control channel resource, and therefore, the SR may be determined to be sent, and if the medium access control entity is not configured with the available physical uplink control channel resource, it may be not possible to send the SR, and therefore, the SR may be determined not to be sent.

Figure 17:
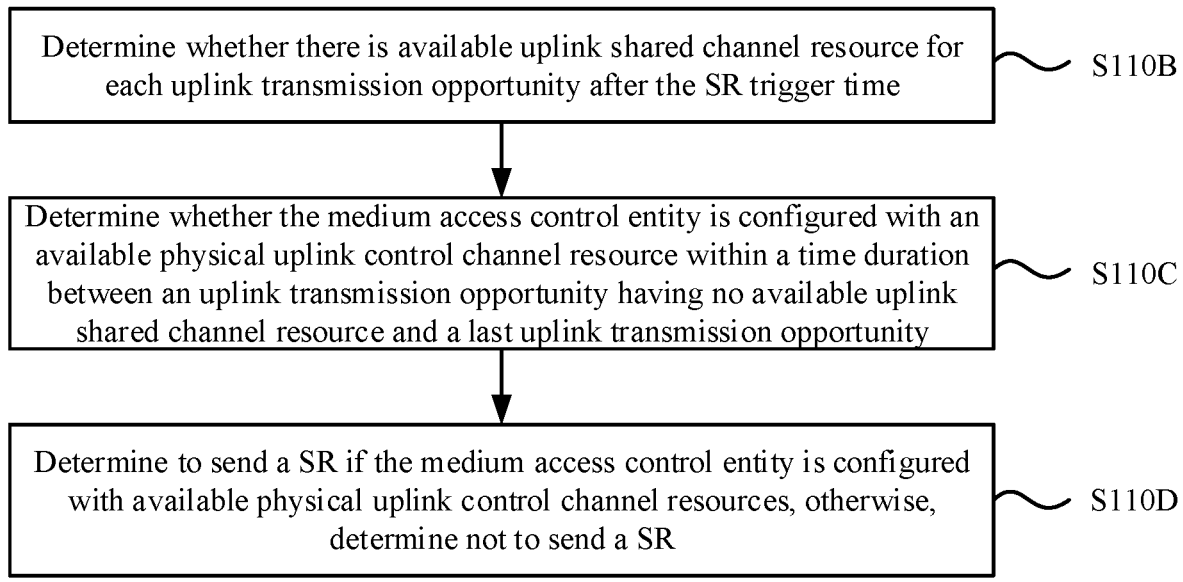
FIG. 17 is a schematic flow chart showing still another method of determining whether to send a scheduling request according to an exemplary aspect of the present disclosure.

FIG. 17 is a schematic flow chart showing still determining whether to send a SR according to an example of the present disclosure. As shown in FIG. 17, on the basis of the example shown in FIG. 12, the determining whether to send a SR includes the following blocks.

In block 110B, it may be determined whether there is available uplink shared channel resource for each uplink transmission opportunity after the SR trigger time;

In block 110C, for an uplink transmission opportunity that does not have an available uplink shared channel resource, it may be determined whether the medium access control entity is configured with an available physical uplink control channel resource within a time duration between the uplink transmission opportunity and the last uplink transmission opportunity;

In block 110D, if the medium access control entity is configured with available physical uplink control channel resources, it may be determined to send a SR, otherwise, it may be determined not to send a SR.

In an example, for each uplink transmission opportunity after the SR trigger time, it may be determined whether there is available uplink shared channel resource. If there is an uplink transmission opportunity available in the uplink shared channel resource, the BSR may be sent through the available uplink shared channel resource, and therefore, the SR is not triggered.

If there is no uplink transmission opportunity available in the uplink shared channel resource, the SR may be triggered, and in order to determine whether to send a SR, it may be required to further determine whether the medium access control entity is configured with available physical uplink control channel resource within a time duration between the uplink transmission opportunity and the last uplink transmission opportunity (before the SR trigger time).

If the medium access control entity is configured with the available physical uplink control channel resource, it may be possible to send the SR through the available physical uplink control channel resource, and therefore, it may be determined to send the SR; and if the medium access control entity is not configured with the available physical uplink control channel resource, it may be determined not to send the SR and determined to request for the uplink shared channel resource by initiating a random access.

It should be noted that, in any of the examples shown in FIG. 12 to FIG. 17, in the case of determining to send a SR, it may be further determined whether the number of times the SR is sent is greater than or equal to a preset number of times, and in the case when the number of times of transmission is less than a preset number of times, it may be determined to send the SR, otherwise, it may be determined not to send the SR.

When the scheduling request is determined to be sent, it may be further determined whether the scheduling request suppression timer is running, and if the scheduling request suppression timer is not running, it may be determined to send the scheduling request, otherwise, not to send the scheduling request.

Optionally, on the basis of any of the examples shown in FIG. 13 to FIG. 17, the method further includes the following blocks.

If there are multiple available uplink control channel resources, the available uplink control channel resource the time of which is closest to the current time may be selected to be used for sending the SR.

In an example, in a case that there are a plurality of available uplink control channel resources, the available uplink control channel resource the time of which is closest to the current time may be selected to be used for sending the SR, thereby reducing a time delay of sending the SR.

Corresponding to the above example of the BSR transmission method, the present disclosure also proposes an example of a BSR transmission device.

Figure 18:
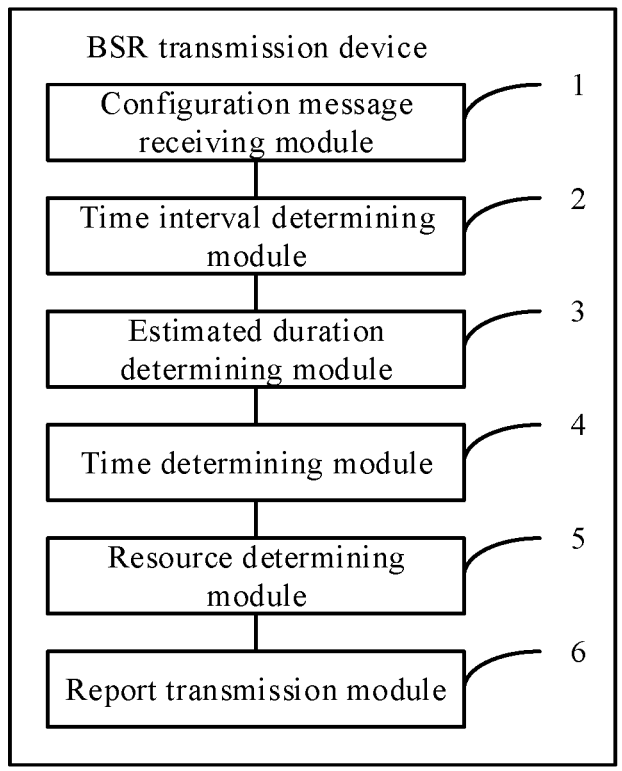
FIG. 18 is a schematic block diagram showing a buffer status report transmission device according to an exemplary aspect of the present disclosure.

FIG. 18 is a schematic block diagram of a BSR transmission device according to an example of the present disclosure. The BSR transmission method shown in this example may be applicable to a user device, and the user device may be an electronic device such as a mobile phone, a tablet computer, or a wearable device.

As shown in FIG. 18, the BSR transmission device may include the following modules.

A configuration message receiving module 1 is configured to receive a configuration message sent by a base station;

A time interval determining module 2 is configured to determine uplink resource allocation indication information sent by the base station and an uplink transmission time interval corresponding to the uplink resource allocation indication information based on the configuration message;

An estimated duration determining module 3 is configured to determine an estimated duration based on the time interval;

A time determining module 4 is configured to determine a buffer status report trigger time, and a time of a physical downlink control channel which is mostly recent to and before the buffer status report trigger time;

A resource determining module 5 is configured to determine whether there is an uplink shared channel resource available in an uplink transmission opportunity, the uplink transmission opportunity being within a time range of the estimated duration from the buffer status report trigger time or from the time of the physical downlink control channel;

A report transmission module 6 is configured to: if there is an uplink shared channel resource available in the uplink transmission opportunity, send a buffer status report to the base station by the available uplink shared channel resource.

Figure 19:
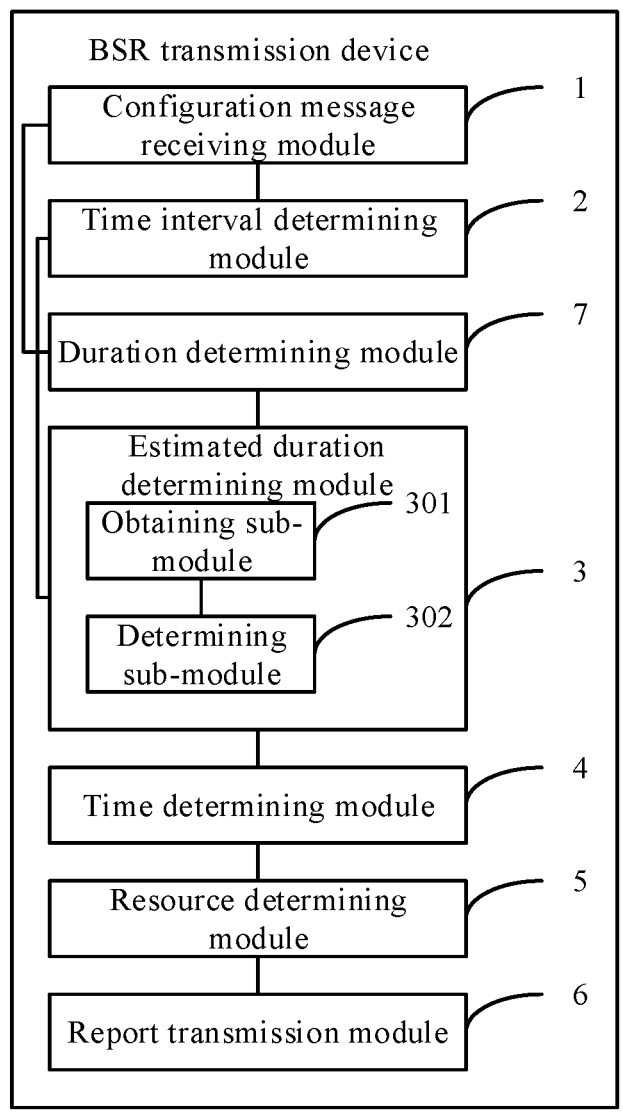
FIG. 19 is a schematic block diagram showing another buffer status report transmission device according to an exemplary aspect of the present disclosure.

FIG. 19 is a schematic block diagram of another buffer status report transmission device according to an example of the present disclosure. As shown in FIG. 19, on the basis of the example shown in FIG. 18, the device further includes the following blocks.

A duration determining module 7 is configured to determine a maximum transmission duration of an uplink shared channel based on the configuration message;

The estimated duration determining module 3 includes:
an obtaining sub-module 301 configured to obtain a correlation table between shared channel transmission durations and the time intervals from the configuration message;
a determining sub-module 302 configured to determine a maximum time interval in the time intervals corresponding to the shared channel transmission durations which are less than the maximum transmission duration of the uplink shared channel in the correlation table, as the estimated duration; or
configured to determine the time interval corresponding to the maximum transmission duration of the uplink shared channel in the correlation table as the estimated duration.

Optionally, the duration determining module is configured to:
determine whether the buffer status report is triggered periodically, or whether the buffer status report is triggered by a buffer status report retransmission timer timeout;
determine a logical channel with the highest priority from logical channels where data to be transmitted exists, if the buffer status report is triggered periodically or triggered by the buffer status report retransmission timer timeout;
determine the maximum transmission duration of the uplink shared channel based on a logical channel prioritization LCP restricted parameter of the logical channel with the highest priority in the configuration message.

Optionally, the duration determining module is configured to:
determine the maximum transmission duration of the uplink shared channel based on the LCP parameter of the logical channel in the configuration message if the buffer status report is not triggered periodically or triggered by the buffer status report retransmission timer timeout;
obtain a maximum shared channel transmission duration from the correlation table as the maximum transmission duration of the uplink shared channel, if the maximum transmission duration of the uplink shared channel does not exist in the LCP restricted parameter of the logical channel that triggers the buffer status report, or if the logical channel that triggers the buffer status report is not determined.

Optionally, the duration determining module is configured to determine the logical channel with the highest priority from the logical channels where data to be transmitted exists and which are configured with the restricted parameter of the shared channel transmission duration, if the buffer status report is triggered periodically or is triggered by a buffer status report retransmission timer timeout.

Optionally, the estimated duration determining module is configured to determine a maximum time interval in the correlation table between the shared channel transmission durations and the time intervals in a logical channel prioritization LCP restricted parameter of the logical channel in the configuration message as the estimated duration.

Optionally, the estimated duration determining module is configured to obtain a correlation table between shared channel transmission durations and the time intervals from the configuration message;
   determine a minimum time interval in the correlation table as the estimated duration.

Optionally, the estimated duration determining module is configured to: obtain a correlation table between shared channel transmission durations and the time intervals from the configuration message;
   perform calculation for each time interval in the correlation table based on a preset algorithm, and use the calculation result as the estimated duration.

Optionally, the estimated duration determining module is further configured to:
   before determining the estimated duration based on the time interval, if the configuration information includes a configured duration corresponding to a logical channel required for sending the buffer status report, wherein the configured duration is equal to a specified time interval in the correlation table between the shared channel transmission durations and the time intervals, use the configured duration as the estimated duration.

Figure 20:
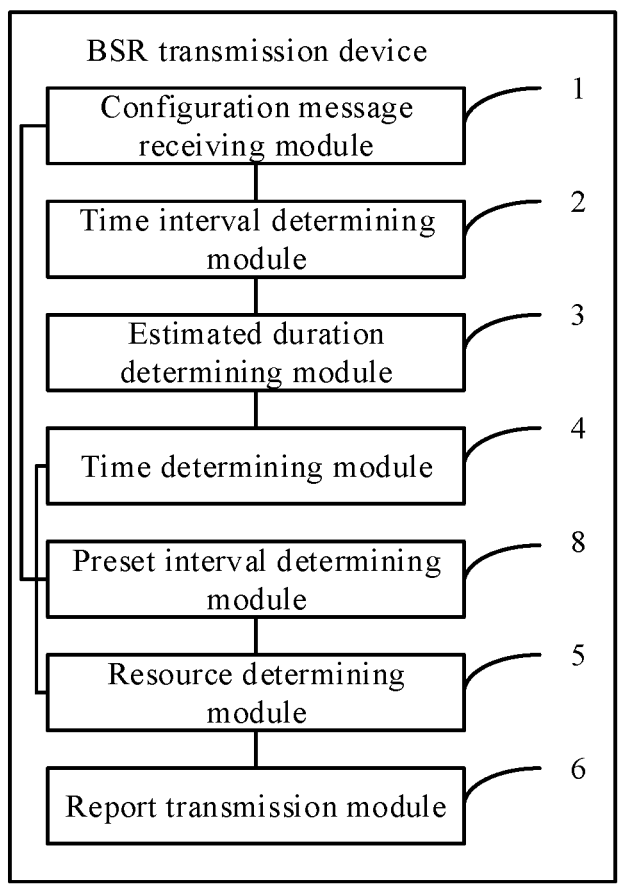
FIG. 20 is a schematic block diagram showing still another buffer status report transmission device according to an exemplary aspect of the present disclosure.

FIG. 20 is a schematic block diagram of still another buffer status report transmission device according to an example of the present disclosure. As shown in FIG. 20, based on the example shown in FIG. 18, the method further includes the following blocks:
   a preset interval determining module 8 configured to:
   before determining whether there is an uplink shared channel resource available in the uplink transmission opportunity,
   determine a preset interval corresponding to a carrier transmitting the buffer status report, wherein, the preset interval is processing time required by the user device, from an end time of the physical downlink control channel through which the user device receives the uplink resource allocation indication information, till a start time of latest possible physical downlink shared channel transmission; The resource determining module is configured to:
   determine whether a time duration from the available uplink shared channel resource to the buffer status report trigger time is greater than the preset interval,
   determine that there is an uplink shared channel resource available in the uplink transmission opportunity if the time duration is greater than the preset interval.

Optionally, the report transmission module is configured to:
   if there is an uplink shared channel resource available in the uplink transmission opportunity,
   determine whether the available uplink shared channel resource is capable of carrying a buffer status report, and
   send the buffer status report to the base station by the available uplink shared channel resource if the available uplink shared channel resource is capable of carrying the buffer status report.

Figure 21:
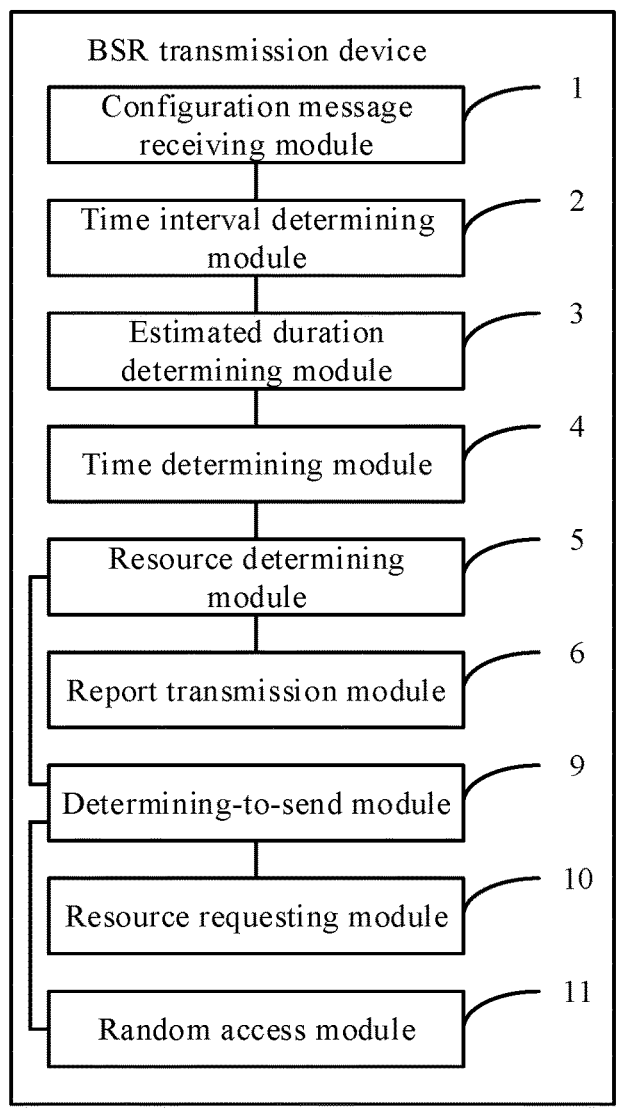
FIG. 21 is a schematic block diagram showing still another buffer status report transmission device according to an exemplary aspect of the present disclosure.

FIG. 21 is a schematic block diagram of still another buffer status report transmission device according to an example of the present disclosure. As shown in FIG. 21, on the basis of the example shown in FIG. 18, the device further includes the following blocks:

a determining-to-send module 9 configured to:
   if there is no uplink shared channel resource available in the uplink transmission opportunity,
   determine to trigger a scheduling request, and determine whether to send the scheduling request, wherein, a time of determining to trigger the scheduling request is a scheduling request trigger time;
a resource requesting module 10 configured to:
   if the determining-to-send module determines to send a scheduling request, request for the uplink shared channel resource by the scheduling request being sent,
   wherein, the report transmission module is configured to send the buffer status report to the base station by the requested uplink shared channel resource;
a random access module 11 configured to:
   if the determining-to-send module determines not to send a scheduling request, request for the uplink shared channel resource by a random access request to the base station,
   wherein, the report transmission module is configured to send the buffer status report to the base station by the requested uplink shared channel resource.

Figure 22:
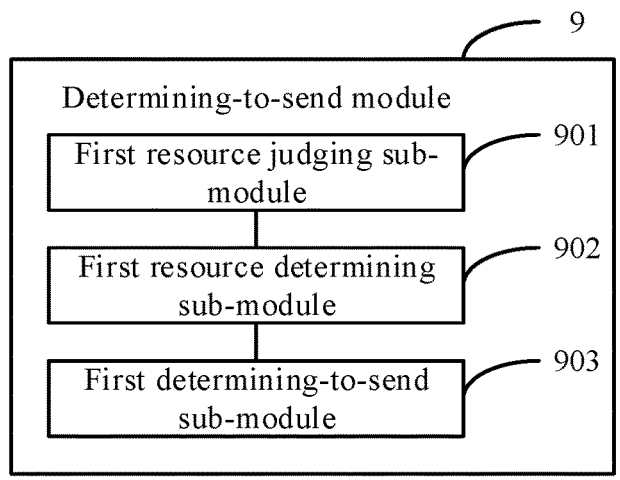
FIG. 22 is a schematic block diagram showing a determining-to-send module according to an exemplary aspect of the present disclosure.

FIG. 22 is a schematic block diagram of a determining-to-send module according to an example of the present disclosure. As shown in FIG. 22, on the basis of the example shown in FIG. 21, the determining-to-send module 9 includes:
   a first resource judging sub-module 901 configured to judge whether there is an uplink shared channel resource available in an uplink transmission opportunity within a time range of the estimated duration from the trigger time of the scheduling request and from the time of each physical downlink control channel after the trigger time of the scheduling request;
   a first resource determining sub-module 902 configured to determine, for an uplink transmission opportunity that does not have an available uplink shared channel resource, whether a medium access control entity is configured with an available physical uplink control channel resource within an estimated duration corresponding to the uplink transmission opportunity;
   a first determining-to-send sub-module 903 configured to: if the medium access control entity is configured with the available physical uplink control channel resource within the estimated duration corresponding to the uplink transmission opportunity, determine to send a scheduling request, otherwise, determine not to send the scheduling request.

Figure 23:
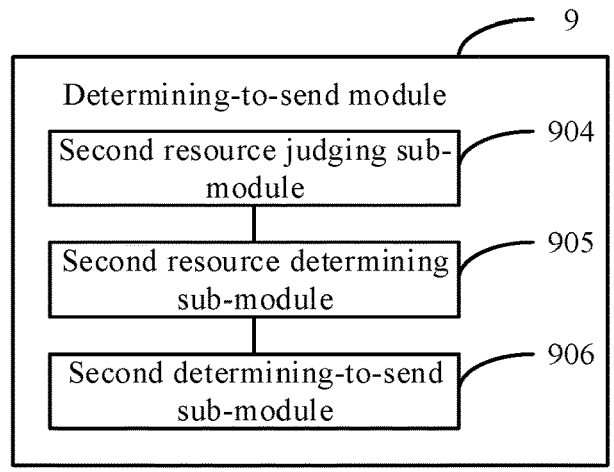
FIG. 23 is a schematic block diagram showing another determining-to-send module according to an exemplary aspect of the present disclosure.

FIG. 23 is a schematic block diagram of another determining-to-send module according to an example of the present disclosure. As shown in FIG. 23, on the basis of the example shown in FIG. 21, the determining-to-send module 9 includes the following blocks:
   a second resource judging sub-module 904 configured to judge whether there is an uplink shared channel resource available in the uplink transmission opportunity within a time range of the estimated duration from the time of the latest physical downlink control channel before the trigger time of the scheduling request, and from the time of each physical downlink control channel after the trigger time of the scheduling request;
   a second resource determining sub-module 905 configured to determine, for an uplink transmission opportunity that does not have an available uplink shared channel resource, whether a medium access control entity is configured with an available physical uplink control channel resource within an estimated duration corresponding to the uplink transmission opportunity;

a second determining-to-send sub-module 906 configured to: if the medium access control entity is configured with the available physical uplink control channel resource within the estimated duration corresponding to the uplink transmission opportunity, determine to send a scheduling request, otherwise, determine not to send the scheduling request.

Figure 24:
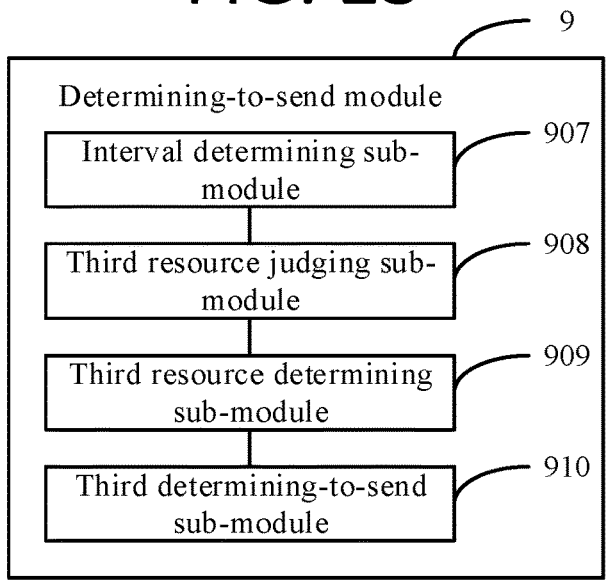
FIG. 24 is a schematic block diagram showing still another determining-to-send module according to an exemplary aspect of the present disclosure.

FIG. 24 is a schematic block diagram of still another determining-to-send module according to an example of the present disclosure. As shown in FIG. 24, on the basis of the example shown in FIG. 21, the determining-to-send module 9 includes the following blocks:

an interval determining sub-module 907 configured to determine a preset interval corresponding to a carrier that sends the scheduling request, wherein the preset interval is processing time required by the user device, from an end time of the physical downlink control channel through which the user device receives the uplink resource allocation indication information, till a start time of latest possible physical downlink shared channel transmission;

a third resource judging sub-module 908 configured to:

judge whether a time duration from the available uplink shared channel resource to the buffer status report trigger time is greater than the preset interval, and determine that there is an uplink shared channel resource available in the uplink transmission opportunity if the time duration is greater than the preset interval, a third resource determining sub-module 909 configured to determine, for an uplink transmission opportunity that has no available uplink shared channel resource, whether the medium access control entity is configured with an available physical uplink control channel resource within the estimated duration corresponding to the uplink transmission opportunity;

a third determining-to-send sub-module 910 configured to:

if the medium access control entity is configured with available physical uplink control channel resource within the estimated duration corresponding to the uplink transmission opportunity, determine to send a scheduling request, otherwise, determine not to send the scheduling request.

Figure 25:
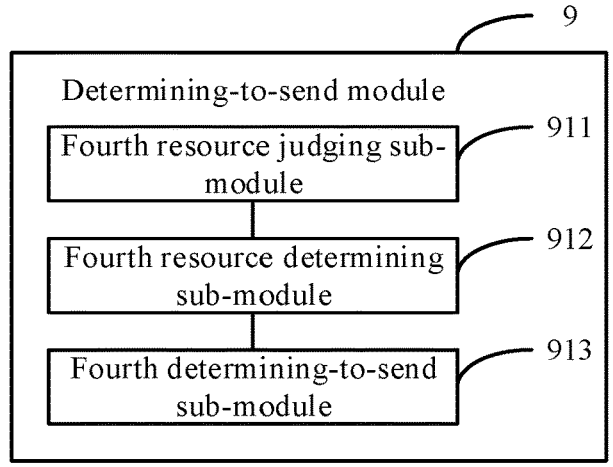
FIG. 25 is a schematic block diagram showing still another determining-to-send module according to an exemplary aspect of the present disclosure.

FIG. 25 is a schematic block diagram of still another determining-to-send module according to an example of the present disclosure. As shown in FIG. 25, on the basis of the example shown in FIG. 21, the determining-to-send module 9 includes the following blocks:

a fourth resource judging sub-module 911 configured to judge whether there is available uplink shared channel resource for each uplink transmission opportunity after the trigger time of the scheduling request;

a fourth resource determining sub-module 912 configured to determine, for an uplink transmission opportunity that does not have an available uplink shared channel resource, whether a medium access control entity is configured with an available physical uplink control channel resource within a time duration between the uplink transmission opportunity and a last uplink transmission opportunity;

a fourth determining-to-send sub-module 913 configured to: if the medium access control entity is configured with available physical uplink control channel resource, determine to send a scheduling request, otherwise, determine not to send the scheduling request.

Optionally, on the basis of any of the examples shown in FIG. 21 to FIG. 24, the device further includes the following blocks:

a selection module configured to: if there are multiple available uplink control channel resources, select an available uplink control channel resource that is closest to the current time, for sending the scheduling request.

With regard to the device in the above examples, the specific manner in which the respective modules perform the operations has been described in detail in the examples of the related methods, and will not be explained in detail herein.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

The present disclosure also proposes an electronic device, including:

a processor;

a memory for storing executable instructions by the processor;

wherein, the processor is configured to:

receive a configuration message sent by a base station;

determine uplink resource allocation indication information sent by the base station and an uplink transmission time interval corresponding to the uplink resource allocation indication information based on the configuration message;

determine an estimated duration based on the time interval;

determine a buffer status report trigger time, and a time of a physical downlink control channel which is mostly recent to and before the buffer status report trigger time;

determine whether there is an uplink shared channel resource available in an uplink transmission opportunity, the uplink transmission opportunity being within a time range of the estimated duration from the buffer status report trigger time or from the time of the physical downlink control channel;

if there is an uplink shared channel resource available in the uplink transmission opportunity, send a buffer status report to the base station by the available uplink shared channel resource.

The present disclosure also proposes a computer readable storage medium having a computer program stored thereon, wherein, the program, when executed by a processor, implements the following steps:

receiving a configuration message sent by a base station;

determining uplink resource allocation indication information sent by the base station and an uplink transmission time interval corresponding to the uplink resource allocation indication information based on the configuration message;

determining an estimated duration based on the time interval;

determining a buffer status report trigger time, and a time of a physical downlink control channel which is mostly recent to and before the buffer status report trigger time;

determining whether there is an uplink shared channel resource available in an uplink transmission opportunity, the uplink transmission opportunity being within a time range of the estimated duration from the buffer status report trigger time or from the time of the physical downlink control channel;

if there is an uplink shared channel resource available in the uplink transmission opportunity, sending a buffer status report to the base station by the available uplink shared channel resource.

Figure 26:
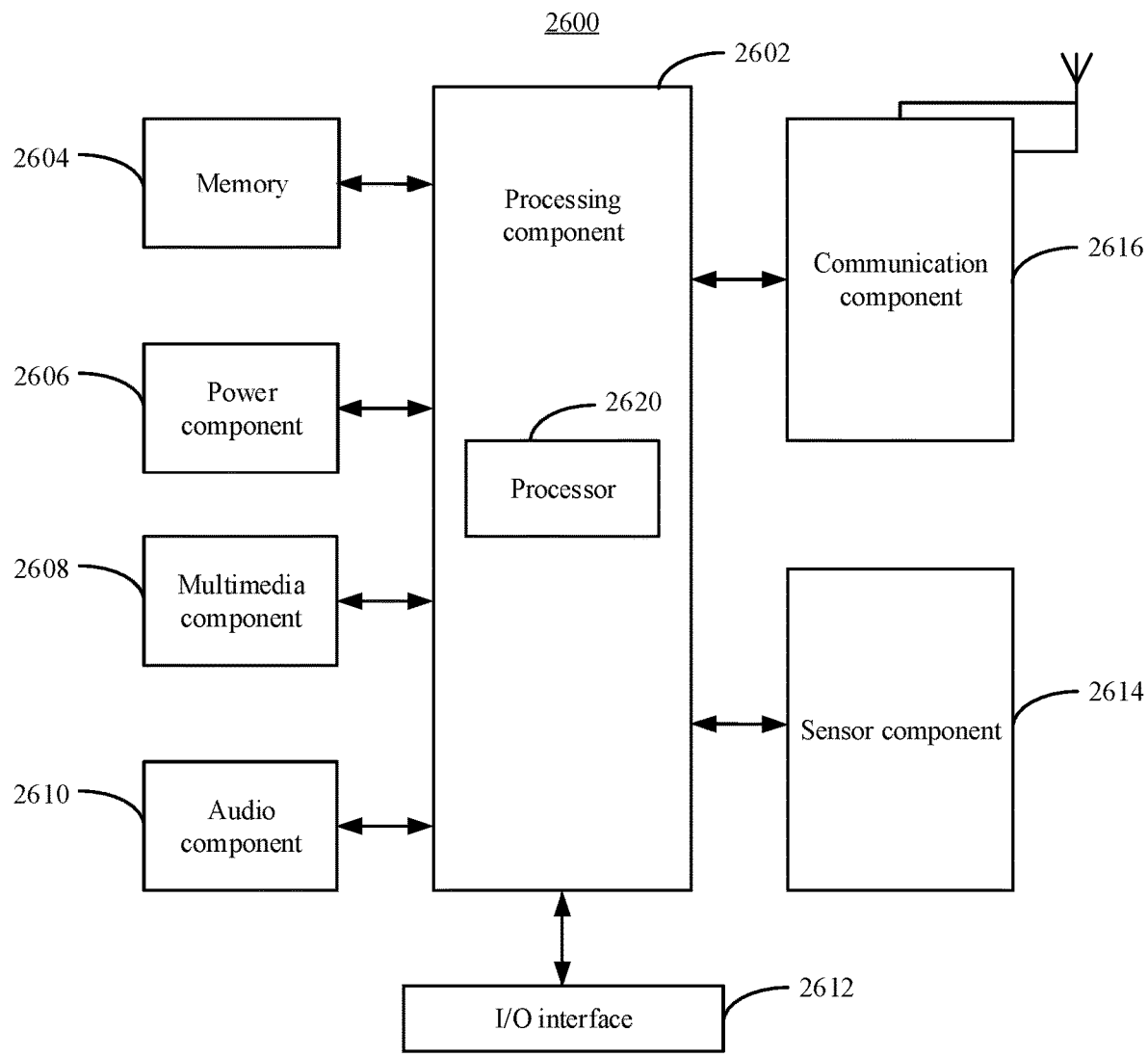
FIG. 26 is a schematic block diagram showing a device for sending a buffer status report according to an exemplary aspect of the present disclosure.

FIG. 26 is a schematic block diagram of a device 2600 for transmitting a buffer status report, according to an exemplary example. For example, device 2600 can be a mobile phone, a computer, a digital broadcast terminal, a message transmitting and receiving device, a gaming console, a tablet device, a medical device, a fitness device, a personal digital assistant, and the like.

Referring to FIG. 26, device 2600 can include one or more of the following components: processing component 2602, memory 2604, power component 2606, multimedia component 2608, audio component 2610, input/output (I/O) interface 2612, sensor component 2614, and a communication component 2616.

Processing component 2602 typically controls the overall operation of device 2600, such as operations associated with display, telephone calls, data communications, camera operations, and recording operations. Processing component 2602 can include one or more processors 2620 to execute instructions to perform all or part of the steps described above. Moreover, processing component 2602 can include one or more modules to facilitate interaction between component 2602 and other components. For example, processing component 2602 can include a multimedia module to facilitate interaction between multimedia component 2608 and processing component 2602.

Memory 2604 is configured to store various types of data to support operation at device 2600. Examples of such data include instructions for any application or method operating on device 2600, contact data, phone book data, messages, pictures, videos, and the like. The memory 2604 can be implemented by any type of volatile or non-volatile storage device or a combination thereof, such as static random access memory (SRAM), electrically erasable programmable read only memory (EEPROM), erasable programmable Read Only Memory (EPROM), programmable Read Only Memory (PROM), Read Only Memory (ROM), Magnetic Memory, Flash Memory, Disk or Optical Disk.

Power component 2606 provides power to various components of device 2600. Power component 2606 can include a power management system, one or more power sources, and other components associated with generating, managing, and distributing power for device 2600.

The multimedia component 2608 includes a screen between the device 2600 and the user that provides an output interface. In some examples, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure associated with the touch or slide operation. In some examples, the multimedia component 2608 includes a front camera and/or a rear camera. When the device 2600 is in an operation mode, such as a shooting mode or a video mode, the front camera and/or the rear camera can receive external multimedia data. Each front and rear camera can be a fixed optical lens system or have focal length and optical zoom capabilities.

The audio component 2610 is configured to output and/or input an audio signal. For example, audio component 2610 includes a microphone (MIC) that is configured to receive an external audio signal when device 2600 is in an operational mode, such as a call mode, a recording mode, and a voice recognition mode. The received audio signal may be further stored in memory 2604 or transmitted via communication component 2616. In some examples, audio component 2610 also includes a speaker for outputting an audio signal.

The I/O interface 2612 provides an interface between the processing component 2602 and the peripheral interface module, which may be a keyboard, a click wheel, a button, or the like. These buttons may include, but are not limited to, a home button, a volume button, a start button, and a lock button.

Sensor component 2614 includes one or more sensors for providing device 2600 with a status assessment of various aspects. For example, sensor component 2614 can detect an open/closed state of device 2600, a relative positioning of components, such as the display and keypad of device 2600, and sensor component 2614 can also detect a change in position of device 2600 or a component of device 2600, the presence or absence of user contact with device 2600, orientation or acceleration/deceleration of device 2600, and temperature change of device 2600. Sensor component 2614 can include a proximity sensor configured to detect the presence of nearby objects without any physical contact. Sensor component 2614 may also include a light sensor, such as a CMOS or CCD image sensor, for use in imaging applications. In some examples, the sensor component 2614 can also include an acceleration sensor, a gyro sensor, a magnetic sensor, a pressure sensor, or a temperature sensor.

Communication component 2616 is configured to facilitate wired or wireless communication between device 2600 and other devices. The device 2600 can access a wireless network based on a communication standard, such as WiFi, 2G or 3G, or a combination thereof. In an exemplary example, communication component 2616 receives broadcast signals or broadcast associated information from an external broadcast management system via a broadcast channel. In an exemplary example, the communication component 2616 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

In an exemplary example, device 2600 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic elements for performing the method described in any of the above examples.

In an exemplary example, there is also provided a non-transitory computer readable storage medium comprising instructions, such as a memory 2604 comprising instructions executable by processor 2620 of device 2600 to perform the above method. For example, the non-transitory computer readable storage medium may be a ROM, a random access memory (RAM), a CD-ROM, a magnetic tape, a floppy disk, and an optical data storage device.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be readily apparent to those skilled in the art after implementing the disclosure by referring to the specification. The present application is intended to cover any variations, uses, or adaptations of the present disclosure, which are in accordance with the general principles of the present disclosure and include common general knowledge or conventional technical means in the art that are not disclosed in the present disclosure. The specification and examples therein are only illustrative, and the scope and spirit of the disclosure are to be indicated by appended claims.

It is to be understood that this disclosure is not limited to the above described structures shown in the drawings, and various changes and modifications can be made to the disclosure without departing from the scope thereof. The scope of the disclosure is to be limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting the present disclosure.

What is claimed is:

1. A method of transmitting a buffer status report (BSR), comprising:
   determining, by a user equipment (UE), whether there is an uplink shared channel available;
   triggering, by the UE, a scheduling request (SR) according to a retransmission timer of the BSR, when there is the uplink shared channel available and parameters configured for the uplink shared channel available do not satisfy a logical channel prioritization (LCP) restriction of a logical channel triggering the BSR,
   wherein the LCP restriction includes at least one of a shared channel transmission duration restriction, a cell restriction, or a subcarrier space restriction.

2. The method of claim 1, further comprising:
   requesting, by the UE, the uplink shared channel according to the SR.

3. The method of claim 1, further comprising:
   sending the BSR, by the uplink shared channel.

4. User equipment (UE), comprising:
   a processor; and
   a memory storing instructions executable by the processor,
   wherein the processor is configured to:
   determine whether there is an uplink shared channel available;
   trigger a scheduling request (SR) according to a retransmission timer of the BSR, when there is the uplink shared channel available and parameters configured for the uplink shared channel available do not satisfy a logical channel prioritization (LCP) restriction of a logical channel triggering the BSR,
   wherein the LCP restriction includes at least one of a shared channel transmission duration restriction, a cell restriction, or a subcarrier space restriction.

5. The UE of claim 4, wherein the processor is further configured to:
   request the uplink shared channel according to the SR.

6. The UE of claim 4, wherein the processor is further configured to:
   send the BSR, by the uplink shared channel.

7. A non-transitory computer-readable storage medium storing instructions that, when executed by a processor in a user equipment (UE), cause the processor to:
   determine whether there is an uplink shared channel available;
   trigger a scheduling request (SR) according to a retransmission timer of a buffer status report (BSR), when there is the uplink shared channel available and parameters configured for the uplink shared channel available do not satisfy a logical channel prioritization (LCP) restriction of a logical channel triggering the BSR,
   wherein the LCP restriction includes at least one of a shared channel transmission duration restriction, a cell restriction, or a subcarrier space restriction.

8. The non-transitory computer-readable storage medium of claim 7, wherein the instructions further cause the processor to:
   request the uplink shared channel according to the SR.

9. The non-transitory computer-readable storage medium of claim 7, wherein the instructions further cause the processor to:
   send the BSR, by the uplink shared channel.

* * * * *